(12) United States Patent (10) Patent No.: US 8,131,553 B2
Attwater et al. (45) Date of Patent: Mar. 6, 2012

(54) TURN-TAKING MODEL

(76) Inventors: David Attwater, Southport (GB); Bruce Balentine, Denton, TX (US)

( * ) Notice: Subject to any disclaimer, the term of this patent is extended or adjusted under 35 U.S.C. 154(b) by 64 days.

(21) Appl. No.: 12/563,254

(22) Filed: Sep. 21, 2009

(65) Prior Publication Data

US 2010/0017212 A1 Jan. 21, 2010

Related U.S. Application Data

(62) Division of application No. 11/317,424, filed on Dec. 22, 2005, now abandoned.

(60) Provisional application No. 60/638,431, filed on Dec. 22, 2004.

(51) Int. Cl.
*G10L 21/00* (2006.01)

(52) U.S. Cl. ........................... 704/270; 704/275

(58) Field of Classification Search .................. 704/270, 704/275, 211, 215, 248, 253
See application file for complete search history.

(56) References Cited

U.S. PATENT DOCUMENTS

| | | | |
|---|---|---|---|
| 5,276,765 A | 1/1994 | Freeman et al. | |
| 5,765,130 A * | 6/1998 | Nguyen | 704/233 |
| 5,999,902 A | 12/1999 | Scahill et al. | |
| 6,173,266 B1 * | 1/2001 | Marx et al. | 704/270 |
| 6,246,986 B1 * | 6/2001 | Ammicht et al. | 704/270 |
| 6,574,595 B1 * | 6/2003 | Mitchell et al. | 704/242 |
| 6,724,864 B1 * | 4/2004 | Denenberg et al. | 379/88.16 |
| 6,941,268 B2 * | 9/2005 | Porter et al. | 704/270 |
| 7,698,141 B2 * | 4/2010 | Aoki et al. | 704/270 |
| 2001/0011217 A1 * | 8/2001 | Ammicht et al. | 704/231 |
| 2002/0049593 A1 | 4/2002 | Shao | |
| 2002/0133341 A1 | 9/2002 | Gillick et al. | |
| 2002/0169806 A1 * | 11/2002 | Wang et al. | 707/541 |
| 2002/0188441 A1 | 12/2002 | Matheson et al. | |
| 2002/0198722 A1 | 12/2002 | Yuschik | |
| 2003/0016793 A1 | 1/2003 | Balentine et al. | |
| 2003/0083874 A1 | 5/2003 | Crane et al. | |
| 2003/0093274 A1 | 5/2003 | Thompson | |
| 2003/0158732 A1 * | 8/2003 | Pi et al. | 704/251 |
| 2004/0078201 A1 | 4/2004 | Porter et al. | |
| 2004/0083107 A1 * | 4/2004 | Noda et al. | 704/270 |
| 2004/0098253 A1 * | 5/2004 | Balentine et al. | 704/215 |
| 2006/0020471 A1 * | 1/2006 | Ju et al. | 704/275 |

OTHER PUBLICATIONS

McInnes et al. "Turn-taking and grounding in spoken telephone number transfers", Speech Communication 43, pp. 205-223, May 2004.*
Takeuchi et al. "Timing Detection for Real time Dialog Systems Using Prosodic and Linguistic Information", Proc. of the International Conference on Speech Prosody, Mar. 2004.*
Cisco Systems, Inc. et al., Speech Application Language Tags (SALT), Document, Jul. 15, 2002, 112 Pages, Cisco Systems, Inc. et al.

(Continued)

*Primary Examiner* — Jialong He
(74) *Attorney, Agent, or Firm* — Hope Baldauff Hartman, LLC

(57) ABSTRACT

A method is claimed for managing interactive dialog between a machine and a user. In one embodiment, an interaction between the machine and the user is managed in response to a timing position of possible speech onset from the user. In another embodiment, the interaction between the machine and the user is dependent upon the timing of a recognition result, which is relative to a cessation of a verbalization of a desired sequence from the machine. In another embodiment, the interaction between the machine and the user is dependent upon a recognition result and whether the desired sequence was ceased or not ceased.

7 Claims, 11 Drawing Sheets

OTHER PUBLICATIONS

W3C, Speech Recognition Grammar Specification, Mar. 16, 2004, Retrieved Dec. 28, 2005 from Internet Site http://www.w3.org/TR/2004/REC-speech-grammar-20040316/, 86 Pages, Version 1.0, W3C.

Spirit Corp, Voice Activity Detector (VAD) Algorithm User's Guide, Mar. 2003, User's Guide, 36 pages, Texas Instruments.

Emanuel A. Schegloff, Overlapping Talk and the Organization of Turn-Taking for Conversation, 2000, 63 pages, Cambridge University Press—Language in Society.

Strom et al., Intelligent Barge-In in Conversational Systems, Oct. 16, 2000, 4 pages, MIT Laboratory for Computer Science.

Weilhammer et al., Durational Aspects in Turn Taking, 4 pages, University of Munich, Germany, Published in Proceedings of the 15th international congress of phonetic sciences, 2003.

Balentine et al., Debouncing the Speech Button: A Sliding Capture Window Device for Synchronizing Turn-Taking, 1997, 27 pages, Kluwer Academic Publishers.

Tichelen, Semantic Interpretation for Speech Recognition, W3C Working Draft, Nov. 8, 2004, 46 pages, W3C.

* cited by examiner

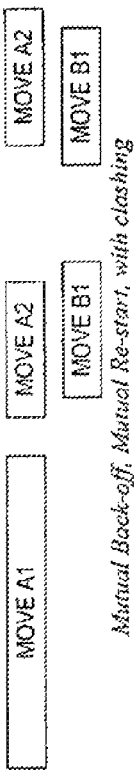

FIG. 1A (Prior Art) — Paused Turn Transition

FIG. 1B (Prior Art) — Overlapping Turn Transition

FIG. 1C (Prior Art) — Clashing Floor Yield at Move Boundary

FIG. 1D (Prior Art) — Clashing Floor - Hold in late response to move boundary

FIG. 1E (Prior Art) — Clashing Floor - Hold in early response to move boundary

FIG. 1F (Prior Art) — Floor-Hold away from move boundary

FIG. 1G (Prior Art) — Mutual Back-off, Mutual Re-start, with clashing

SALT: Automatic Mode

SALT: Multiple Mode Listen Timeline

TURN-TAKING MODEL

CROSS-REFERENCE TO RELATED APPLICATIONS

This application is a divisional patent application and claims priority to U.S. patent application Ser. No. 11/317,424, filed Dec. 22, 2005 now abandoned, which claims priority from U.S. Provisional Patent Application 60/638,431, filed Dec. 22, 2004, both of which are hereby incorporated by reference.

FIELD OF THE INVENTION

The present invention relates to a turn-taking state machine, and more particularly, to a turn-taking model for an interactive system that handles an interaction between a person and a machine which uses speech recognition.

DESCRIPTION OF THE RELATED ART

The term 'Turn-taking' refers to the pattern of interaction which occurs when two or more people communicate using spoken language. At any given moment one or all of the people in a conversation may be speaking, thinking of speaking or remaining silent. Turn-taking is the protocol by which the participants in the conversation decide whether, and when, it is their turn to speak.

The normal pattern of turn-taking is for one person to speak at a time. There are however many instances where speakers overlap their speech. Turns evolve over time and have internal structure. A 'turn' may actually comprise a number of "turns-so-far"—termed Turn Constructional Units (TCU). TCUs will often be capable of forming turns in their own right—i.e. a turn is made up of smaller turns. For clarity, in this description we shall adopt the term 'Move' for a TCU, where turns are made up of one or more moves. Boundaries between moves form potential turn-taking boundaries.

At some move boundaries (e.g. at the end of a question), the speaker will elect for another speaker to take over at that point. Even when speakers elect to give the turn away, they may choose to re-claim it again if the listener chooses not to respond. Listeners may of course self-select to take turns at other points.

Turn-taking can also exist in a conversation between a machine and a person or 'user'. Just as in Human-Human conversation, Human-Machine conversation must deal with the phenomena of interruptions. When one of the conversants—say the machine—is speaking then the other conversant—the user—may choose to remain silent or interrupt at any moment. The response of the machine to such interruption will define its turn-taking policy. On interruption, for example, it may choose to 'hold' the 'floor' or 'yield' it.

The use of the term 'floor' is by analogy to formal debate where speakers are given the 'floor' in order to express their views one at a time. To 'hold' the floor is to continue speaking whilst being interrupted. To 'yield' the floor is to either stop speaking on an interruption (a self-selected turn-change)—or to stop speaking to give someone the chance to speak next (an elective turn change).

Yielding the Floor

The most common turn-taking patterns are orderly transitions at turn-taking boundaries. These comprise three primary patterns. FIG. 1A shows an orderly transition of a turn where speaker A pauses, speaker B speaks in the pause, and Speaker A yields the floor (i.e. lets speaker B continue). Such patterns generally occur at elective turn-taking boundaries i.e. where the speaker intends the other person to speak. FIG. 1B shows a similarly ordered transition but where the speaker B has anticipated the turn-transition point at the end of A1. Speaker A has yielded in a similar manner. This pattern may occur in elective transitions or self-selected ones. That is to say, speaker A may have had something planned to say following turn A1 but chose not to continue with the planned utterance. Finally, FIG. 1C shows the case where speaker B started to respond to utterance A1, but it was a late response and speaker A has begun the next move. Speaker A interprets this interruption as a response to turn A1 and immediately backs-off to let speaker B1 continue. It should be noted that overlapping speech such as that shown in the two examples is more common in telephone conversations than in face-to-face conversations.

Holding the Floor

The other less frequent, but still significant pattern seen in human-human conversation is floor-holding. Here the speaker chooses to hold the conversational floor in the presence of an interruption from the other speaker. There can be many different reasons for doing so—which will depend amongst other things on the topic, the nature of the task, and relative social relationships between the speakers.

FIGS. 1D and 1E show two examples of floor-holding by speaker A in the presence of an interruption at or around the boundary of two moves. There are several other patterns, depending on the point of interruption and duration of the interruption. The common feature of these patterns is that speaker B backs-off and allows speaker A to continue. In such circumstances, speaker B will generally hold the planned utterance B1 and produce it later if it is still relevant given the context. Floor holding often causes the thwarted speaker to re-produce the aborted utterance at the next turn-taking opportunity. FIG. 1F shows the situation where speaker B has interrupted speaker A in the middle of a move. Speaker A has ignored the interruption and continued speaking. Such interruptions are not common in human-human task oriented conversation, but do occur. Examples include speaking along with the giver (for example during a number confirmation), side comments to other participants, and strongly competitive interruptions. It is of interest that in automated dialogues, such occurrences are much more common due to the unusual social contract between man and system—and the deliberate encouragement of the use of barge-in as a user-interface device.

Mutual Back-Off and Re-Starts

On occasions in human-human conversation, when the conversants clash, they both choose to back-off. FIG. 1G shows an example of this. When both conversants have backed-off, an ambiguous state has occurred in the natural turn-taking protocol, and oscillations can occur with repeated back-offs. It often becomes necessary to recourse to meta-dialogue—"you first!", which of course can also clash. Such clashes are quite common in current man-machine dialogues employing "barge-in" for reasons which will be discussed later. "Barge-in" refers to one conversant explicitly speaking while the other conversant has the floor for the purpose of creating an interruption.

Current day automated systems that deal with Turn-Taking between a user and a machine use either Half-Duplex or Full-Duplex mechanisms. Patterns which are seen in half-duplex systems are:

The prompt is never stopped. Speakers are ignored whilst the prompt is playing. If they are still speaking at the end of the prompt—spoke-too-soon conditions are thrown by the recognizer. In this situation tones can be used to denote that users must repeat their utterances. This could be termed an "Always-Hold" protocol.

Patterns which are seen in current full-duplex systems are: The prompt is stopped when speech input is detected, sometimes after a short delay. Echo cancellation is used to clean-up any overlapping of the speech. Recognition of the signal is performed which returns when confident result is detected, usually relying on a short period of silence to determine this juncture. This result is returned to the application which decides what to do next. The response is assumed to relate to the prompt which was stopped. Uncertain recognition usually will result in a repeat of the previous prompt or something with similar meaning along with optional error messages. Systems generally vary in how quickly they cut the prompt after speech is detected. This can be due to:

a. Autonomic prompt cut on speech detect—(may be slight inherent delay)

b. Deliberate checking of the initial signal to check whether it looks like valid speech.

c. Recognition of whole utterance up to band-silence.

These options could be labeled as the following strategies.

(a) "Always-Yield"
    (b) "Yield on Speech"
    (c) "Yield when confident"

Current speech user-interface designs generally use 'barge-in' for one of two purposes—although they are rarely distinguished in the literature. These are:

1) Barge-in as a user-interface device: The user understands that they can interrupt machine prompts at any time. They generally know the available keywords and consciously choose to interrupt the machine as an explicit act.

2) Barge-in to manage turn-taking overlaps: The user interrupts the end of a machine prompt as a natural overlapping turn-taking behavior due to anticipation of the turn-taking juncture. The behavior is generally autonomic although it can be modified with conscious effort.

The confusion between the two is generally compounded by the common practice of recording multiple turns, or phrases with internal turn-taking junctures in a single prompt.

The problem with the use of barge-in for the second purpose is that the technology displays universal behavior regardless of where in the prompt the interruption occurs. This often leads to serious errors which are amplified by the user interface. A prompt may be cut-off by an extraneous noise and almost immediately it begins to play. This will then return a rejected result from the speech recognizer. The application designer then interprets this as a user behavior error, and enters error correction—designed to correct an error in response to a prompt which the user has not yet heard. The result is generally unstable user-interface performance, particularly in the presence of noise.

The other problem often observed with current barge-in technology results from delays between the detection of an interruption and the cutoff of the prompt. As described above, this can be due to inherent technology limitations, or by deliberate design in an attempt to avoid the false cut-off problem described above. The result however is that the interrupting user perceives that the machine is 'holding-the-floor', and therefore backs-off their own speech just as the machine shuts off its own prompt. Then machine and user are in a race for who will speak first, and turn-clashing can occur cyclically and unpredictably.

The final problem seen in current state-of-the-art is interruptions at the start of prompts which are delayed responses to the previous phrase. In general this does not result in an obvious error—if the same grammar and dialogue state persist between the two phrases. However, in designs which make default transitions of dialogue state between phrases this can result in dialogue state errors.

SUMMARY OF THE INVENTION

A method is disclosed for managing interactive dialog between a machine and a user. In one embodiment, an interaction between the machine and the user is managed in response to a timing position of possible speech onset from the user. In another embodiment, the interaction between the machine and the user is dependent upon the timing of a recognition result, which is relative to a cessation of a verbalization of a desired sequence from the machine. Further, the interaction between the machine and the user is dependent upon a recognition result and whether the desired sequence was ceased or not ceased.

BRIEF DESCRIPTION OF THE DRAWINGS

For a more complete understanding of the present disclosure and the advantages described herein, reference is now made to the following descriptions taken in conjunction with the accompanying drawings, in which:

FIGS. 1A-1G illustrate the prior art of common turn-taking patterns seen in human to human conversations;

DETAILED DESCRIPTION

Figure 2:
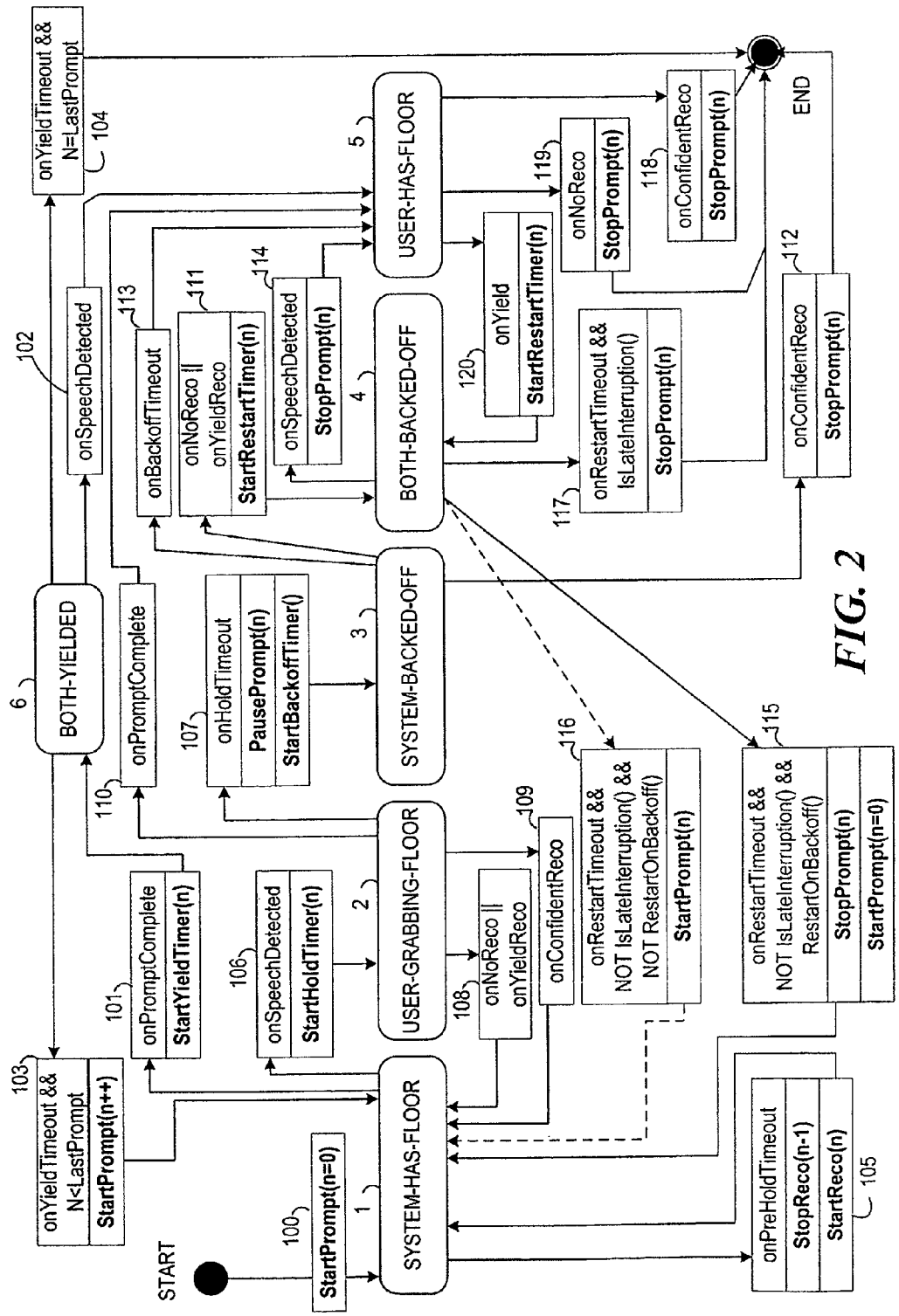
FIG. 2 illustrates a state diagram representing a turn-taking model for a system-user turn.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, and the like, have been omitted inasmuch as such details are not considered necessary to obtain a complete understanding of the present invention, and are considered to be within the understanding of persons of ordinary skill in the relevant art.

The turn taking design of this disclosure attempts to model the turn-taking process more explicitly than the prior art by selecting "Hold" or "Yield" strategies based on:
 a) point of interruption in the prompt; and/or
 b) explicit model of turn-taking and back-off.

Machine Turns and Moves

From the perspective of this disclosure a turn is the period from which a machine starts speaking through to where it decides that a significant user-event has occurred which needs application logic to respond to it. It is thus an autonomic state machine responding primarily to local information managing the basic sharing of the speech channel between two interlocutors—in this case the machine and the user.

If the user remains silent, a machine turn can be formulated in advance to be a sequence of spoken phrases (or moves) which will be spoken by the machine in sequential order until it requires a response in order to move forward.

An example turn would be:

Please select one of the following: news, sport and weather. This could be considered to be made up of four Moves:
 [Please select one of the following] [news] [sport] [and weather].

The selection of what constitutes a move is not mandated by this design. It is however anticipated that generally:
 a) Each move will be a phrase in its own right.
 b) Each move will have a pause before and after it (pauses may be very short).

It is further assumed that the point of interruption of a move by a speaker is important and will affect the model.

This design recognizes that amongst other things, any move boundary may act as a turn-taking cue, and that move boundaries will generally coincide with phrasal boundaries. Consider the following example:
[What would you like to do?] [2 sec pause] [You can say one of the following] [news] [sport] [and weather J [2 sec pause] [or hold for an agent]

For the purpose of clarity we treat this as a single 'turn', but the design is actually neutral to this linguistic distinction. The design takes as its input a sequence of moves which may be anticipated in the absence of any user response, each potentially with its own anticipated grammar, and a specified pause following each move.

Turn starts are more likely at move boundaries, especially where there is a pause between the moves. This invention adopts different turn-taking behaviors depending on the point of interruption by the user. In order to facilitate this, each machine move is broken up into three optional zones:
 i. Pre-Hold Zone
 ii. Hold Zone
 iii. Post-Hold Zone.

Figure 3:
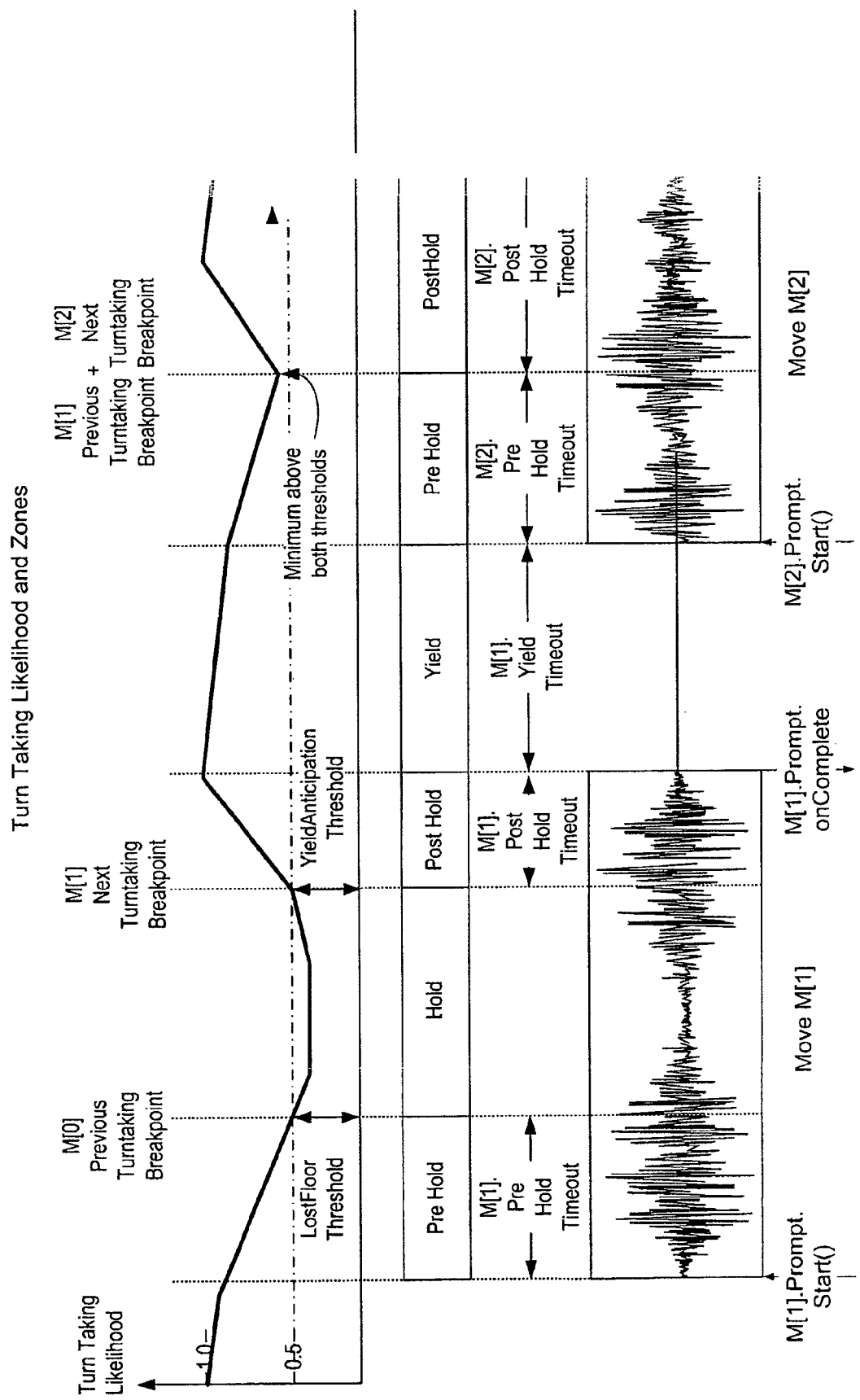
FIG. 3 illustrates three zones of turn-taking yield and hold behavior in a move.
Figure 4:
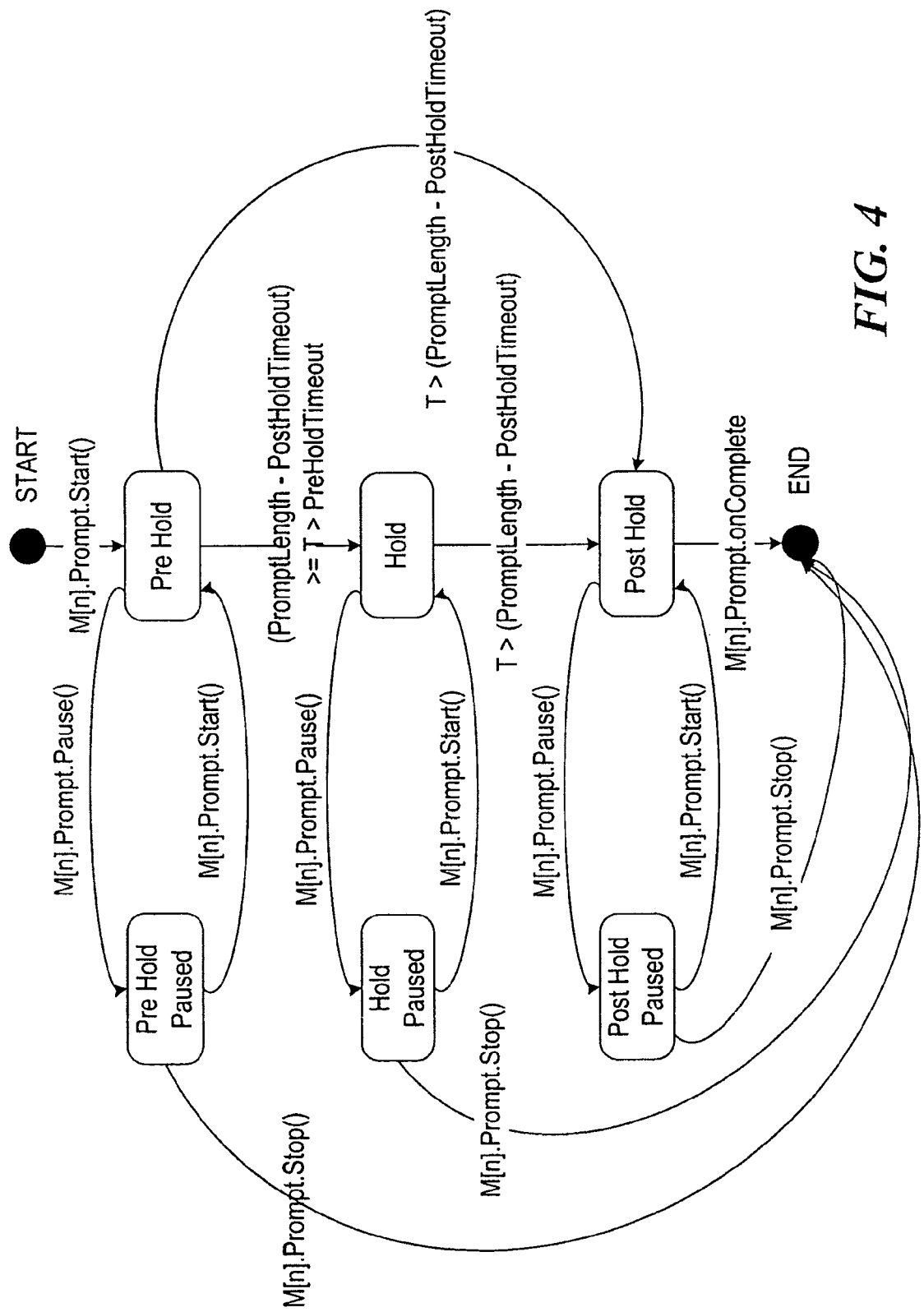
FIG. 4 illustrates a state diagram depicting the three zones of turn-taking yield and hold behavior in a move.

These zones can be seen in FIGS. 3 and 4. Each of the zones could be optionally zero length but, where present, they follow in this same ordered sequence.

The three zones can be defined by just two breakpoints—termed the PreHoldTimeout and PostHold Timeouts. This invention does not depend on the method by which these break points are determined. These two timeouts could for example be derived from turn-taking likelihood functions, or simply defined by the developer.

FIG. 3 illustrates the likelihood of a turn-taking act from the user dropping as the move progresses, it then rises again as the move completes. The moves in this diagram are assumed to present strong turn-taking cues to the user. The shape of these likelihood functions are idealized and will vary depending on prosodic, semantic, pragmatic and other extra-linguistic cues which are present in the user-interface. For example, the prior knowledge of the user interface and the propensity to use barge-in as a user interface device can alter the diagram of FIG. 3. Other methods of determining turn-taking likelihoods may also be envisaged by those skilled in the art.

With reference to FIG. 3, one way to determine the Pre-Hold, Hold and PostHold Zones and their corresponding timeouts would be to apply two parameters shown in Table 1 below:

TABLE 1

| Parameter | Description | Default(sec) |
|---|---|---|
| LostFloorThreshold | The threshold below which the machine turn moves from the Pre-Hold state to the Hold state as the floor is taken away from the user by the machine. | 0.5 |
| YieldAnticipationThreshold | The threshold above which the machine turn moves from the Hold state to the Post-Hold state, as the user anticipates the turn-taking boundary that is approaching. | 0.5 |

The first breakpoint occurs when the likelihood of a user—response to the previous move has fallen below a certain value (LostFloorThreshold), the second where the emerging likelihood of a user—response to the current phrase rises above a certain value (AnticipationThreshold).

If the function never reaches these thresholds then the Hold state never occurs. The PreHold state transitions directly into the PostHold state. This could be due to a sequence of short moves, low threshold values, or other parameters in the likelihood function model. In this circumstance, the boundary between these states is taken to be the point at which the minimum value of the function occurs (i.e. co-incident at the same point where contribution to the turn-taking likelihoods are equal from the previous move and the next move). If the minimum occurs at a point with a gradient of zero (i.e. has a fixed minimum value over a certain time period, then the boundary is taken to be the time representing the mid-point of this fixed region.

FIG. 4 illustrates the progression through the three zones as a state machine where state transition points are defined by the timeouts described above, and the length of the prompt.

Pre-Hold Zone.

An interruption during the Pre-hold zone occurs prior to the key information in the prompt being heard by the listener. It is therefore likely to actually be a late response to the previous move. In this region the machine yields to this input and cuts the current prompt delivery.

Hold Zone.

In this zone, the likelihood of a turn-taking act by the user is lessened considerably (according to the usual protocols of conversational turn-taking)—however it is still possible. Interruption in this zone is likely to be very late response to previous moves, or an anticipated response to the current move if the user is already familiar with the dialogue model. In this region the machine will hold the floor. This does not however mean that it is ignoring the user input. In applications where users are familiar with the domain and/or choose to use the explicit barge-in style, the hold zone may be of zero length. This could happen dynamically in response to an explicit model of user turn-taking likelihood.

Post-Hold Zone.

In the post hold zone, the key information in the current move is likely to have been perceived by the user. Interruption in this zone is likely to be a normal anticipation of the end of the move. If key information is revealed early in the move (A common design practice that may indicate that there are multiple actual moves in the 'move') then the Post-Yield zone may actually be quite long. In this region it is assumed that the machine will yield to interruptions. This yield may even go unnoticed if it is sufficiently near to the end of the move.

These three zones closely emulate human communication behavior. Where they are used in conjunction with user interface designs containing relatively short moves they will result in stable user interfaces which are intuitively accessible to users.

In this disclosure the interruptions which are initiated in the three different zones result in either 'yield' or 'hold' behavior. Through the choice of various parameters the generalized turn-taking engine described below can deliver a continuum of behaviour from 'immediate yield' through to 'always hold'. The yield zones use parameter sets which result in relatively rapid yield and the hold zone uses different parameters which results in the behaviour of holding the floor.

Example of Hold Zones

An un-contested Turn can therefore be viewed as a sequence of the following zones:
  Move 1. Pre Yield
  Move 1. Hold
  Move 1. Post Yield
  Move 1. Yield Timeout
  Move 2. Pre-Yield
  Move 2. Hold
  Etc etc. . . .
  Move N. Pre yield
  Move N. Hold
  Move N. post Yield.
  Move N. Yield Timeout.
  (Turn ends with 'silence' on no response).

The YieldTimeout defines the pause following each move. The YieldTimeout of the final move will be considerably longer in order to fully give the turn away at that point. Recall that moves can optionally omit PreHold, Hold or PostHold Zones by setting the appropriate timeouts, and that the Yield-Timeout can be set to zero.

The user may of course also be making turns and moves in a similar fashion to the machine. With current technology the machine unfortunately has access to much less information regarding the user turn.

This design can utilize the speech application language tags ("SALT") model. This is an event based model where listen and prompt are independent threads—giving the designer the widest range of options yet for building turn-taking models. The SALT model is commonly known in the art. Other similar models could be used. It is also anticipated that speech technology vendors will develop better ways of detecting user phrase boundaries, disfluent re-starts, and yielding behavior. Should this happen then the current design will be able to make use of this extra information.

The SALT model is a standard which is close to the state of the art regarding what machines can know about user turns as perceived by a speech recognizer. The SALT model comprises independent <Prompt> and <Listen> threads which can be started—Start( ), paused—Pause( ) or stopped—Stop( ). Prompts and Listens throw events as they execute. It is the designer's role to catch these events and co-ordinate the interaction between <prompt> and <listen>.

Figure 5:
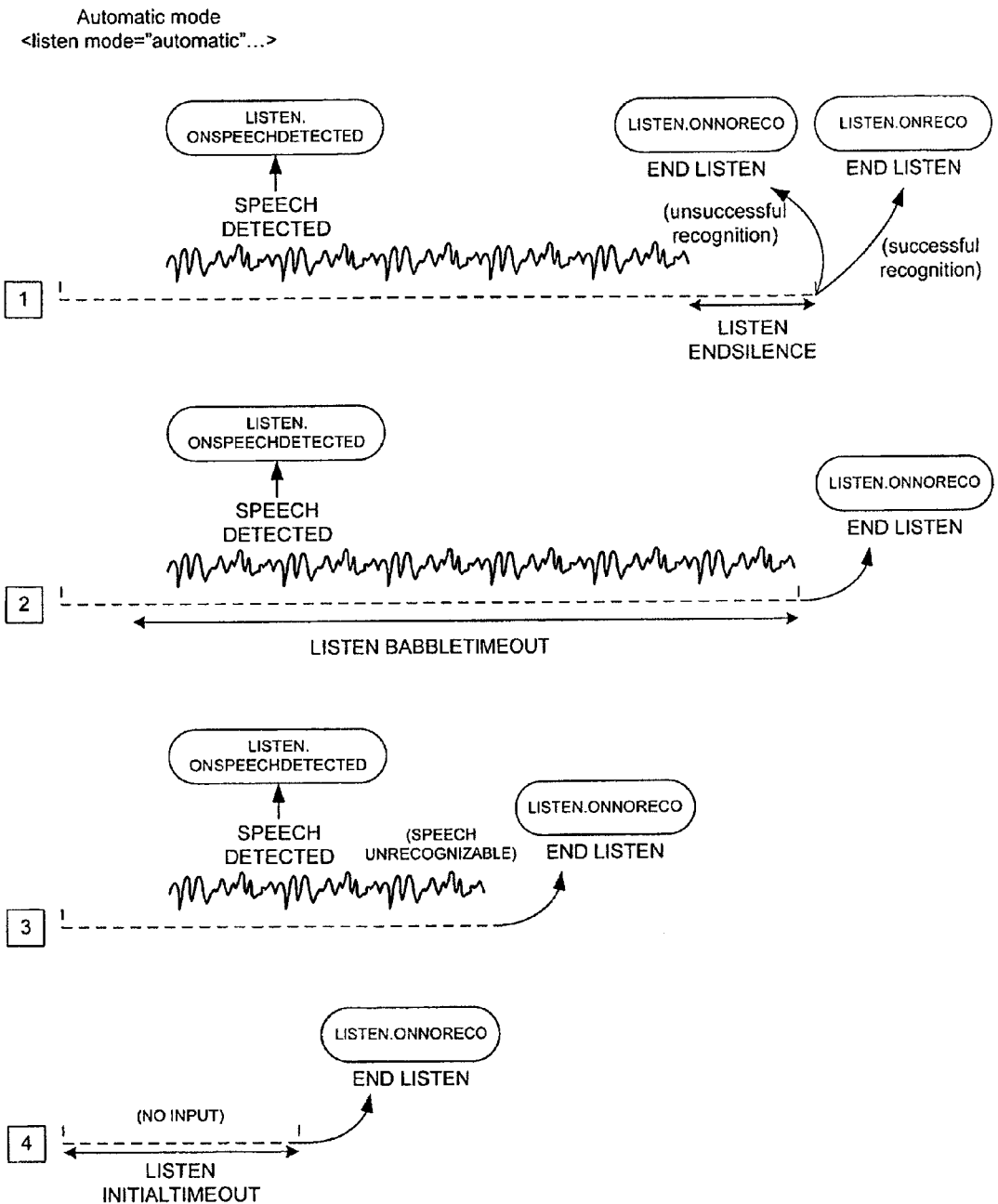
FIG. 5 illustrates a detailed diagram of a SALT Automatic Listen Mode.
Figure 6:
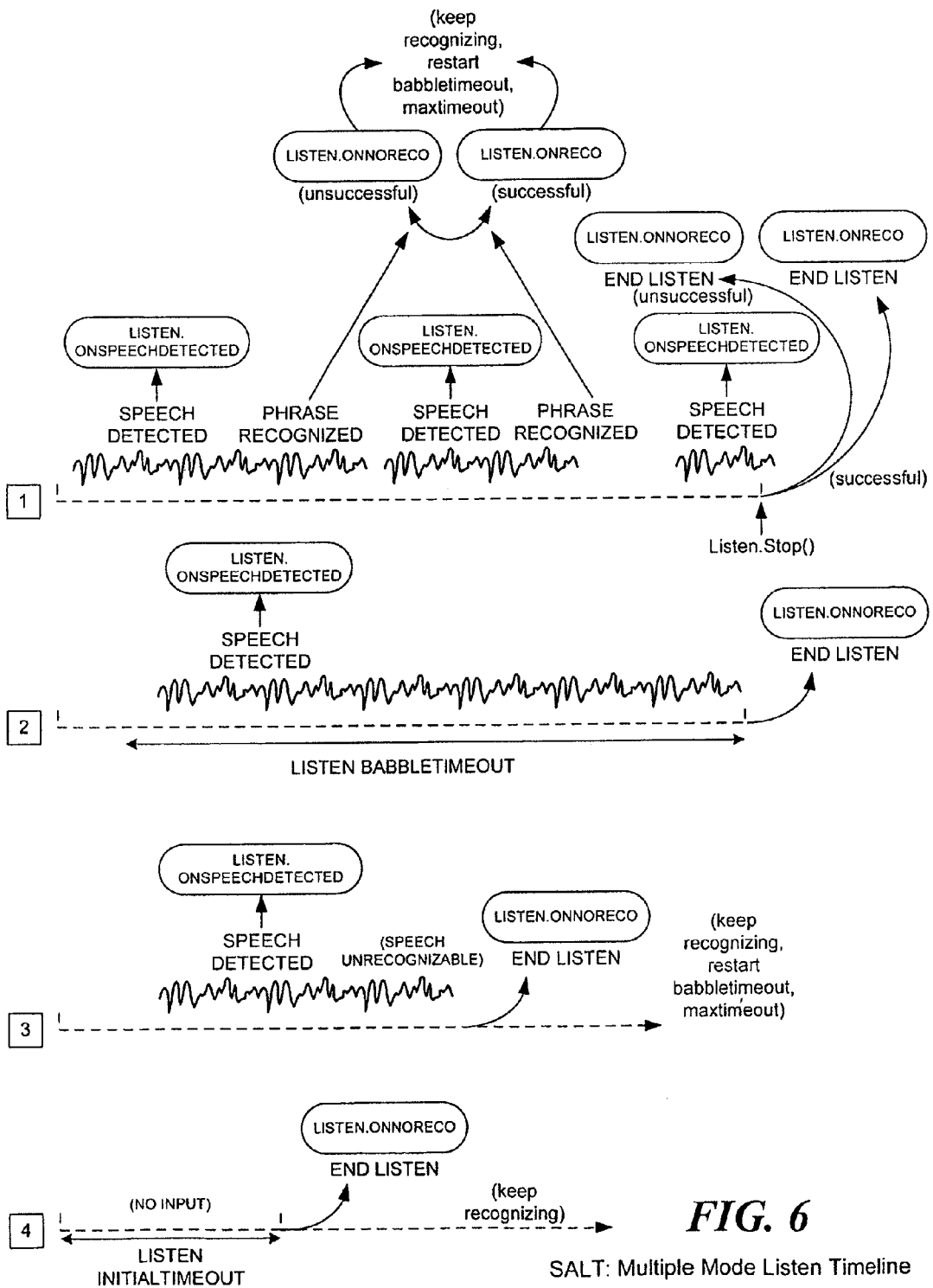
FIG. 6 illustrates a detailed diagram of a SALT Multiple Listen Mode.

There are three listen modes described by SALT: Single; Automatic; and Multiple. The current design anticipates that the recognition will use Multiple Mode (FIG. 6), although Multiple Mode can be emulated using Automatic mode (FIG. 5) by restarting the recognizer whenever onSilence (silence detected), onReco (recognizable speech detected), onNoReco (un-recognizable speech detected) events are received. Single mode is designed for multi-modal push-to-talk applications which do not have conversational turn-taking, and therefore it is not relevant to this disclosure.

In automatic mode, the recognizer is running continuously unless explicitly stopped. It throws events when there is speech matching the grammar (onReco) or speech not matching the grammar (onNoReco) has been detected. It also throws events whenever the start of an utterance is detected.

In one embodiment, FIG. 2 depicts a primary state machine that is used to model the turn-taking behavior. A simple auxiliary state machine can be used to keep track of the PreHold, Hold, and PostHold states of move playback as described above. As shown in FIG. 2, these states are:
  1) System has floor
  2) User grabbing floor.
  3) System backed-off.
  4) Both backed-off
  5) User has floor
  6) Both yielded.

An additional state can occur if the machine interrupted the user deliberately. FIG. 2 shows the operation of a turn engine where this state is omitted.

Event Model

The state machine responds to the following events:

| | |
|---|---|
| onPromptComplete | SALT:prompt.onComplete |
| onSpeechDetected | SALT: listen.onSpeechDetected |
| onConfidentReco | SALT:listen.onReco && NOT (Match(YieldGrammar)) |
| onYieldReco | SALT:listen.onReco && Match(YieldGrammar) |
| onNoReco | SALT: listen.onNoReco |
| onPreHoldTimeout | Thrown by PreHoldTimer. |
| onHoldTimeout | Thrown by HoldTimer. |
| onBackoffTimeout | Thrown by BackoffTimer. |
| onRestartTimeout | Thrown by RestartTimer. |
| onYieldTimeout | Thrown by YieldTimer. |

Most events are self-explanatory with the exception of onConfidentReco and onYieldReco. This design allows designers to explicitly model partial yielded responses in the speech recognition grammar (represented by YieldGrammar). Successful matches against this grammar are taken to be indications that the user has yielded the floor by giving an incomplete utterance. The onYieldReco event can be replaced by a better classifier for detecting back-off at a later date with no change to the current design. The onConfidentReco event merely reflects the SALT onReco event, excluding this YieldGrammar. Most current speech recognizers are unable to detect floor yield specifically. Thus this invention uses 'low confidence recognition' as a term to refer to YieldReco as well as NoReco.

It should be noted that any set of events performing the same function as the above could replace the above definitions. For example better models to distinguish confident results from rejected results could be substituted. It is not the purpose of this design to describe optimal classifiers of speech events. By way of example, the classification onReco and onNoReco could be enhanced using a confidence measure based on turn-taking likelihood as well as acoustic likelihood. Note also that the YieldGrammar performs the function of modeling spontaneous restarts in user speech within the turn taking state engine.

In some embodiments the machine responds differently to events depending on the state it is in when the results are returned. Most notably it can do the following: Considering FIG. 2, transitions between the states are denoted by arrows from one state to another. These transitions have trigger conditions and actions associated with them. These trigger conditions and actions are shown in boxes attached to the transition arrows. Transitions trigger conditions are shown in the first box in ordinary type. These comprise boolean combinations of events and boolean functions based on parameters associated with the turn engine. When an event is thrown, then relevant transitions from the current state that contain that event in the trigger conditions are evaluated. If there are additional boolean guard criteria on the trigger condition these are also evaluated. If a transition trigger condition evaluates to the boolean value 'true' then the transition is triggered. Once a transition is triggered then actions associated with that trigger are then executed.

These are shown in bold type in the figure. Some transitions have no actions associated with them and some have more than one action associated with them.

Timers

Timer objects are simple objects which run in their own threads. They are started with a timeout value. Timeout values are associated with each move. They may vary from move to move depending on the move function and content. Timers are started with Timer.Start(timeout-value), Paused with Timer.Pause( ) and stopped with Timer.Stop( ) in a manner directly analogous to the starting, pausing and stopping of SALT objects. Once they reach their timeout values they throw the corresponding onTimeout event. A paused timer is continued with a subsequent Start( ) operation. Timers are reset using the Stop( ) operation.

Move Model

The turn taking model assumes that moves are represented by an array of Moves—denoted M[n]. Each move has prompt—denoted M[n].prompt, and a listen element denoted M[m].reco. In this model each move models a single phrase, and the associated reco object is pre-loaded with the appropriate grammar in response to that phrase and surrounding context.

In this design sequential moves are represented using a sequence of SALT prompt objects, one for each move. An alternative approach would be to use a single SALT prompt object for the whole turn. The moves would then simply be part of this prompt and have embedded silence between them to represent the YieldTimeout for each move. Bookmarks may be thrown at the start and end of moves to synchronize the state machine with the move boundaries.

Note that the reco for a move is started AFTER the prompt for a given move—the reco for the previous move is still listening as the next prompt starts. This implements turn-overlapping in a straightforward manner, although there are other ways to implement the same feature.

Transition Actions

Actions are expressed as functions as shown below:

| Action | Definition |
| --- | --- |
| StartPrompt(n) | M[n].Prompt.Start( ) |
| | PreHoldTimer. Start(M[n].PreHoldTimeout) |
| | T[n].Start( ) |
| StartPromptX(n) | M[n].Prompt.Start( ) |
| | T[n].Start( ) |
| PausePrompt(n) | M[n].Prompt.Pause( ) |
| | PreHoldTimer.Pause( ) |
| | T.Pause( ) |
| StopPrompt(n) | M[n].Prompt.Stop( ) |
| | PreHoldTimer.Stop( ) |
| StopReco(n) | M.[n].Reco.Stop( ) |
| StartReco(n) | M.[n].Reco.Start( ) |
| StartYieldTimer(n) | PreHoldTimer.Stop( ) |
| | yieldTimer.Start(M[n].YieldTimeout) |
| StartYieldTimerNbi(n) | If(NOT BargeIn) { |
| | yieldTimer.Start(M[n].YieldTimeout) } |
| StartHoldTimer(n) | holdTimer.Stop( ) |
| | holdTimer.Start(M[n].GetHoldTimeout(T)) |
| StartBackoffTimer(n) | backoffTimer.Start(M[n].BackoffTimeout) |
| StartRestartTimer(n) | restartTimer.Start(M[n].RestartTimeout) |

The turn engine starts by setting the move index (n) to zero and then playing the prompt associated with this first move (100).

Timers, Timeouts and Their Effect

Move Timer (T)

The timer value (T) denotes the reference timestamp of the current place in the playback of the move prompt. This timer is started when a move prompt is started, paused when the prompt is paused, but not stopped when the prompt is stopped.

This timer drives the transition through the different zone states shown in FIG. 4. Multiple concurrent move timers can exist, one for each move. These timers can be left to run until the end of the dialog, one for each move. This is only a necessary feature if a Turn Confidence function is used in order to calculate the move zones. In this alternative form the turn taking onset likelihood is calculated as the sum of the contributions of previous moves as well as the current move. More details on onset likelihood are provided by commonly owned, co-pending patent application "Turn-Taking Confidence" by Attwater, Ser. No. 11/317,391, filed on Dec. 22, 2005. For practical reasons these timers can be stopped after an appropriate period of time—for example at the end of the turn, or after a number of further moves have elapsed. The MoveTimer does not directly trigger any transitions in the state machine of FIG. 2.

YieldTimeout

This is the simplest of all the timeouts. It defines the pause following a move once it has completed. It is analogous to the 'InitialTimeout' of the SALT listen element. The state both-yielded (6) is entered at the end of the prompt for each move when onPromptComplete is thrown (101), and held until the YieldTimeout completes or speech is detected. If speech is detected during this wait (102), the user has taken the floor, and user-has-floor state is entered (5). If the timeout completes, the next move prompt is started by incrementing the move counter n, and starting the prompt associated with the next move denoted by n (103). Alternatively the turn completes if there are no waiting moves (104).

This transition (104) represents one way to end the turn state engine. Note that in this design the recognizer is not stopped at the end of the turn—allowing its operation overlap with the beginning of the next turn by re-entering the state machine once more. The PreHoldTimeout of the first move of the next turn controls this overlap (105). In this way seamless overlaps between turns are achieved by this design.

PreHoldTimeout

This timeout represents the time from the start of the prompt associated with a move up to the point where the PreHold zone ends. Whilst in the System-Has-Floor state (1), this timeout causes the Reco object for the previous move to be stopped, and the one associated with the current move to be started, implementing the overlap mechanism described above (105). It has already been mentioned that each move has its own associated grammar. In many cases this grammar may be the same for each move, but there may be reasons to change the grammar between moves—for example if the next move is likely to significantly alter the user's expectations of what to say next.

In one embodiment, the recognizer is not stopped at the end of the move—allowing its operation to overlap with the beginning of the next move. The PreHoldTimeout can define the point at which the recognizer will be re-initialized with the new grammar. During the PreHoldZone the caller is judged to be more likely to be responding to the previous move rather than the currently evolving one.

Indeed if the turn eventually completes successfully as a result of an interruption prior to PreHoldTimeout then the result must have matched the grammar for the previous move not the currently evolving one. This can occur if the state machine completes via transition (112) or transition (118) in FIG. 2.

Similarly the eventual rejection of an utterance which starts prior to the PreHoldTimeout completing can be treated similarly. This can occur if the state machine completes the turn via transition (117) or transition (119) in FIG. 2. Such a rejection will represent the failure of the previous turn. Under such circumstances it would be sensible for dialog design to return to the previous dialog state or enter error correction associated with the previous dialogue state. This is a desirable feature but not an essential feature of the invention. If all of the moves are associated with the same grammar then this feature is not required.

The PreHoldTimer is Started( ) and Paused( ) and Stopped( ) in concert with the prompt for the current move via the functions StartPrompt( ), PausePrompt( ) and StopPrompt( ). The value of the PreHoldTimeout should not exceed the length of its associated move prompt.

HoldTimeout

The Hold Timeout denotes how long the system holds the floor after detecting an interruption by the user until it actually cuts the prompt. It is started when speech is detected in the System-Has-Floor state (106) which causes the transition to the UserGrabbing-Floor state (2). This is a way of extending the delay which may already occur between the actual onset of user speech or noise, and the point where the recognizer reports this as onSpeechDetected. In some embodiments it is preferable for this integral delay to be relatively short.

Cutting the prompt is a turn yielding action and changes the state of the turn-taking protocol. The Hold Timeout therefore lets the system wait a while. In the absence of any other events the completion of this timeout period causes the current move to be paused (i.e. stopped, but in such a way that it could be continued later if necessary), and the System-Backed-Off state is entered (107). This is only useful if the recognizer can report useful information in this timeout period. If we could poll for results then we may be able to see how the recognition was evolving in this period (This would emulate what some recognizers already do in this regard)—However in the SALT model, the system can wait to see whether an OOG (out-of-grammar) result or very rapid recognition is returned. Brief noises may be ignored as a result.

If the move completes while the user is grabbing the floor then the user is automatically granted the floor and the state User-Has-Floor is entered (110). This timeout is varied according to when the prompt is interrupted, and is the primary mechanism for implementing the hold or yield strategies in the different move zones. Even in PreHold and PostHold zones non-zero values may be desirable.

The HoldTimeout should not be confused with the PreHoldTimeout. The function GetHoldTimeout(T) embodies this behavior. In some embodiments this function can return the timeout values according to which zone the interruption occurred in as follows:

```
int GetHoldTimeout(int T) {
  Case GetZone(T):
    (Pre Hold):    HoldTimeout=200ms; break;
    (Hold):        HoldTimeout=infinity; break;
    (Post Hold):   HoldTimeout=300ms; break;
    Return HoldTimeout;
}
```

The non-zero values in the Pre and Post Hold regions can be used to damp the recognizer response to short noises in these regions.

FIG. 4 shows a possible definition for the function GetZone (T). The states PreHoldPause, HoldPaused and Post Hold Paused represent that case where the prompt has been paused whilst in the corresponding zone.

In the User-Grabbing-Floor state (2)—defined by the HoldTimeout—Noises or partial Yields are ignored and the system returns to the System-Has-Floor state (108). Confident responses which complete before the timeout are also apparently ignored from the user perspective (109). The results from such confident responses can be remembered and used to boost the confidence of subsequent recognitions of the same utterance. Such behavior is less desirable in the Pre and Post yield zones, hence the timeout values for these zones are selected to be shorter than the shortest anticipated word. They can be increased if long utterances are anticipated. In an alternative embodiment, confident results can be accepted in the state User-Grabbing-Floor and complete the state machine in a manner analogous to transitions from the Both-Backed-Off state (112) and the UserHas-Floor state (118).

Figure 11:
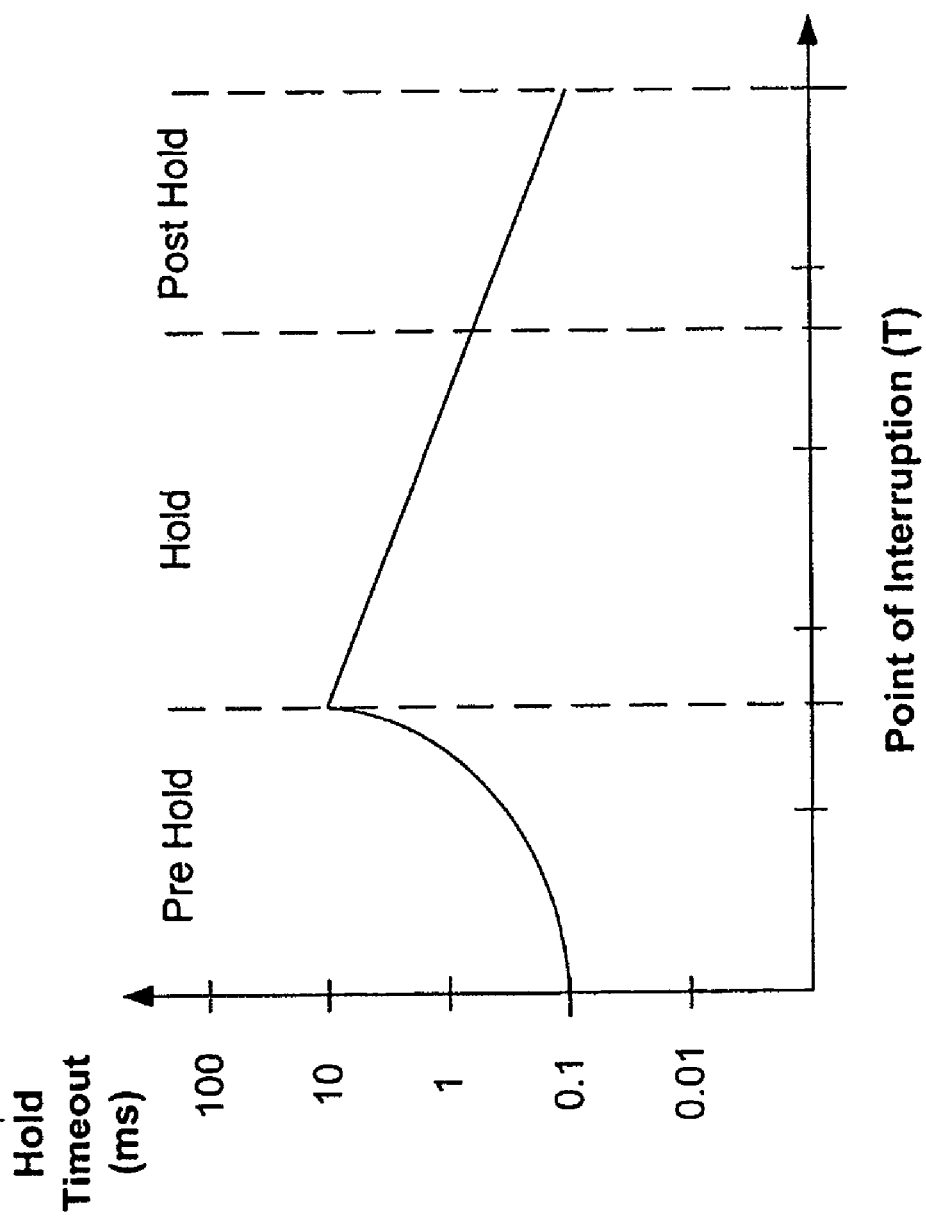
FIG. 11 illustrates an alternative method of calculating HoldTimeouts based on the point of speech onset.

Those skilled in the art could conceive of many different definition of the function GetHoldTimeout. Each definition would define the machines 'attitude' towards interruptions and floor holding. FIG. 11 shows an example of how based on the point of speech or noise onsets a continuous function could be used to derive the Hold Timeout. In the example, the Hold Timeout rapidly increases from a minimum value (100 milliseconds) to a finite maximum value (10 seconds) at the boundary of the Hold zone. The timeout then falls steadily (in the logarithmic domain) through the Hold and Post Hold zones. The use of finite values means that the turn machine opearates upon a continuum between floor yielding and floor holding policies rather than the abrupt transition between floor holding and floor yielding described above.

The HoldTimeout could alternatively be selected such that it causes the prompt to be paused at the end of the next spoken word. Such behavior would be made possible by making use of the timing information obtained by forced alignment of the prompt text and a recorded utterance, or obtained directly from a speech synthesizer.

Back Off Timeout

The Back Off Timeout begins as the System yields the floor to an interruption following the Hold Timeout (107). This timeout represents the perceptual period following back-off in which the user will not perceive that the turn has been unequivocally given away by the system. It defines the maximum period in which the state machine will remain in the System-Backed-Off state (3). Note that the machine prompt is Paused, not stopped following this timeout (107). If, during this short back-off period just after the machine has fallen silent, the end of user speech in the form of an uncertain recognition or yield is detected, the turn taking engine will assume that the user has backed off and proceed to the both-backed-off state (111). Confident recognition during the back-off state however is taken at face value and the turn completes—more accurately the state machine completes to let the parent state machine decide on the next course of action (112).

If no recognition result occurs during the backoff period then, on completion of the BackOffTimeout, the user is still talking, and is now assumed to be clearly holding the floor. The state machine progresses to the user-has-floor state (113). A default value of less than 200 ms is suggested for this timeout.

RestartTimeout

Once the Both-Backed-Off state is entered (4) the Restart Timer is started (111). In this state the user has fallen silent and the machine is also silent. An impasse has occurred. The Restart timer can define the duration which the machine is prepared to wait to see whether the user will re-start their utterance spontaneously. If the user restarts during this time period then the current move is considered complete, and the user is unequivocally given the floor, moving to the User-Has-Floor state (114).

This timeout can be set to a relatively long period, as it is analogous to the usual recognition silence timeout. A value of between 0 and 1000 ms is suggested but it could be longer. Changing this value will affect the emergent property of whether the machine is eager to grab turns back. This will affect the perceived personality of the machine, and this timeout may be set according to design criteria. If the user does not speak before the timeout is reached, then one of three transitions occur:

1. If the interruption point was early in the prompt (defined by the logical NOT of the boolean function IsLateInterruption), and a policy of Restarting on Backoff (defined by the boolean function RestartOnBackoff) is in place, then the move can be re-started. This will result in the apparent effect of a disfluent restart of the whole turn on behalf of the machine in response to external interruptions (115). Disfluent re-starts can be perceived by users as inappropriate behavior and often not recalled after the interaction.
2. If the same condition as above occurs and RestartOnBackoff( ) is false, then the machine prompt can be started again—i.e. it continues from where it was paused. This behavior is only appropriate if the hold timeout and restart timeout have low values. (116).
3. If the interruption point was late in the prompt, the turn can be completed. The user has chosen not to speak, and the machine must decide what to do next (117).

A possible enhancement to the first step of re-starting a move (115) could be to restart from the start of the previous move boundary instead of the start of the turn. In this case the value of n would not be reset to zero. A further alternative would be to modify the form of the repeated turn or move. A subtly different prompt could be used with the same meaning which could prevent a mechanical sounding effect on repetition of previous prompts. In addition or as an alternative a re-start signal phrase such as 'Sorry!' may be interjected to signal the re-start. This is a behavior often seen in human language during disfluent re-starts.

A possible enhancement to the second step (116) would be to continue the prompt at the point where it would have reached had it continued to play to reduce the perceptual impact of the interruption. Another similar approach would be to begin to modulate the volume of the prompt down to a low value on transition to the System-Backed-Off state. This modulation could follow some kind of amplitude envelope designed to emulate the effect of a speaker cutting off an utterance in mid vocalization. The volume would be modulated up again on return to the System-Has-Floor state. A further enhancement would be to back-track to a previous syllable boundary in the current move—if the syllable boundaries of the current utterance are known to the system.

The IsLateInterruption function can be defined in a number of ways. One embodiment would return a false value if the interruption occurred during the PostHold zone but true otherwise. This means that the function would return true in the Hold zone and Post Hold zone. Where the HoldTimeout is infinite in the Hold zone then the condition cannot actually occur under normal circumstances. This definition anticipates the case where the HoldTimeout could also have a finite value in the Hold zone.

In an alternative embodiment, this function could always return a false value. In this case transition 117 would never occur and the decision whether to restart the prompt or not would be independent of the point of the interruption.

In a further embodiment of the present invention, the system could modulate the timeout parameters according to a turn confidence function. The turn confidence function factors in the confidence applied to a user input based upon the timing of the user input.

Recognition Returns when User has Floor

In this case confident or non confident recognition will cause the turn to end. It is up to the application to decide what to do next (118) (119). In the unlikely event that an onYield event occurs under these circumstances the user can be given the chance for a re-start as described above (120).

Simplifying the Model for Non-SALT Applications

This invention is made possible by the fine grained control that the SALT model provides for the Prompt and Reco SALT elements. On most of the current day speech application platforms the developer does not have this level of control. More specifically where the barge-in model is fixed then control over when the prompt is cut relative to the interruption is pre-defined regardless of the point of interruption. Assuming that barge-in is enabled on the platform then the recognizer is started at the start of the turn. If barge-in is not enabled then the recognizer is started at the completion of the prompt.

Figure 7:
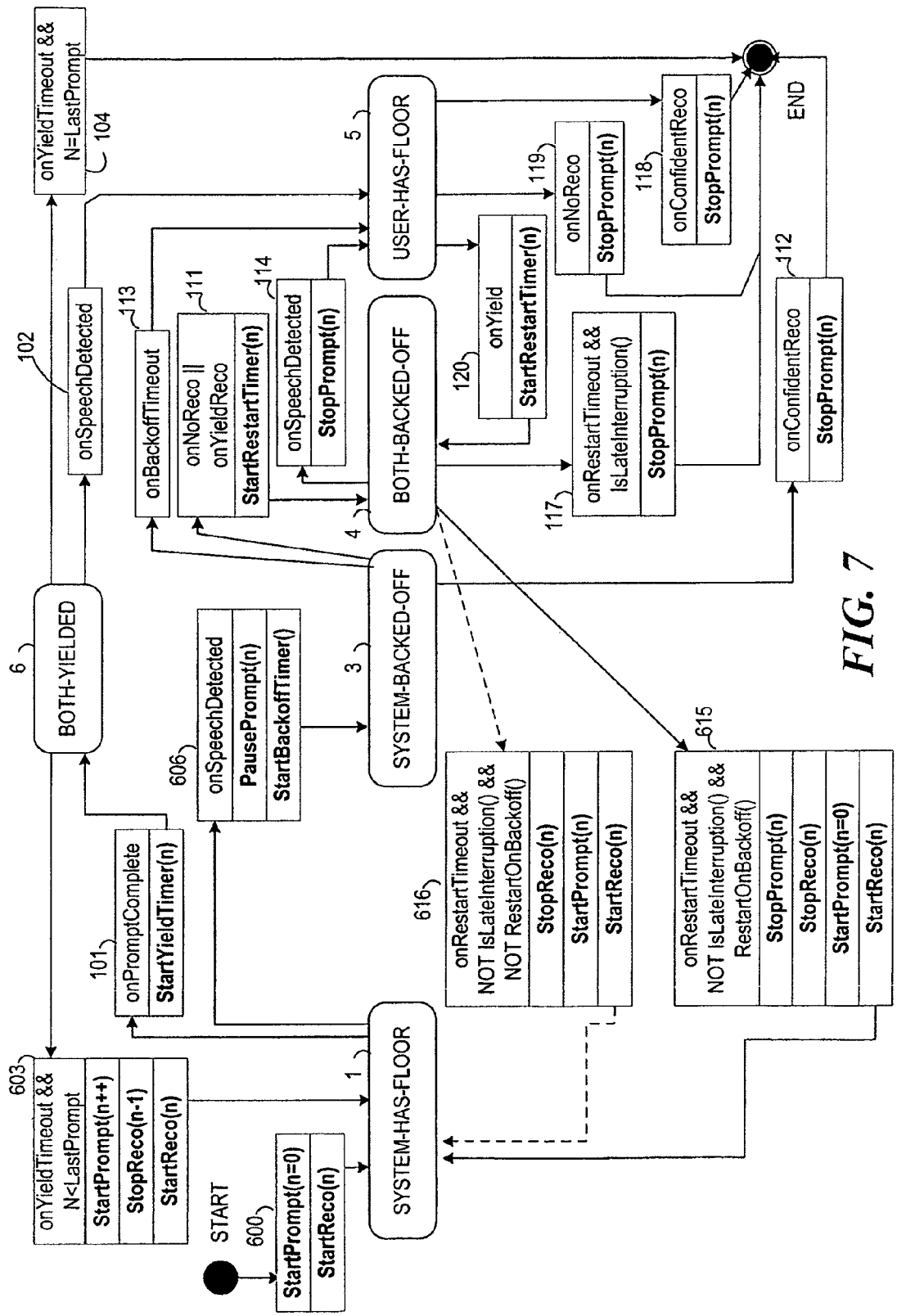
FIG. 7 illustrates a state diagram representing a turn-taking model for a system-user turn wherein HoldTimeout=0 and the onPreHoldTimeout transition is removed.

Most current combinations of speech recognizer and telephony platform only support 'AutomaticMode'. This invention can be implemented using this mode by restarting the recognizer explicitly when it returns a result as described above. With such systems the User-Grabbing-Floor state (2) cannot be supported, and the onPreHoldTimeout transition (105) becomes redundant. FIG. 7 shows the effect of reducing FIG. 2 under these limitations. Transitions (106) and (107) are merged to form transition (606). The resulting engine has lost a couple of features. First, it loses the power to overlap prompting and recognition between moves. The actions in transitions (100), (103), (115) and (116) are altered accordingly to give those shown in transitions (600), (603), (615), and (616). There is still the opportunity to change the grammar at the boundaries between the moves. In many cases however this will not be required. Second, the prompt cut-off behavior can be the same regardless of the timing of an interruption. Several features remain however.

The BackOffTimeout can still be implemented. This means that potential user back-offs can be detected, and the engine can decide whether to restart the move or turn again as described above. Recall that this is equivalent to a disfluent restart by the machine. It can be seen that this feature is independent of the manner in which the prompt was ceased following the detection of a user interruption. Note also that the IsLateInterruption function can still be defined in such a way that the decision to restart the prompt can be dependent on the point of interruption of the move.

The RestartTimeout can also still be implemented. This means that users who do back-off can still be given the opportunity to re-start their backed-off utterance.

Noise Stabilization by Modifying the Floor Holding Properties of Whole Turns

Figure 8:
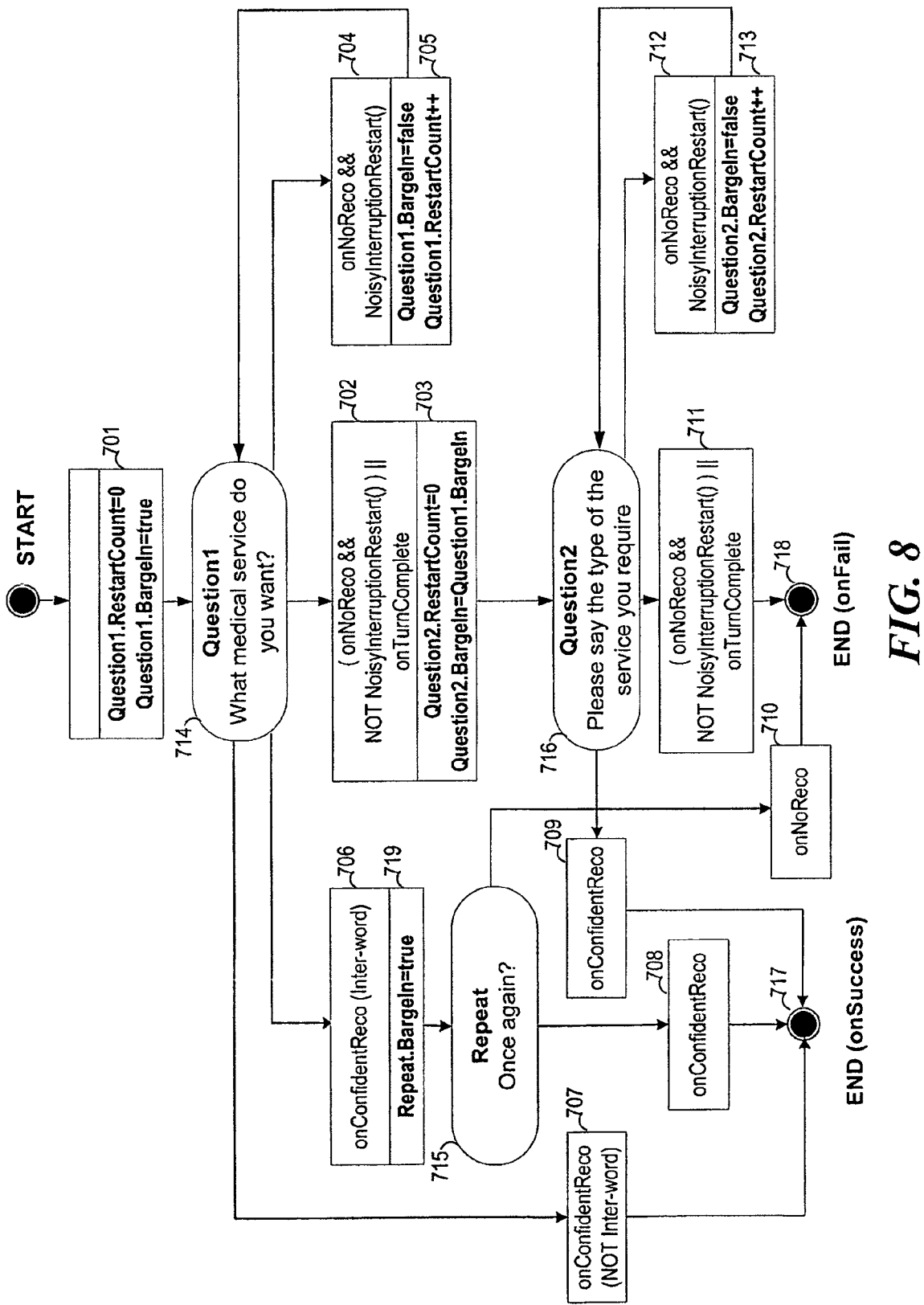
FIG. 8 illustrates a question answering device which causes restarts in the presence of noise.

In a further embodiment of the invention there are circumstances in which the floor-holding policy may need to be adjusted depending on the evolving history of the call. Examples of such instances may be in the suspected presence of noise for example. FIG. 8 shows a simple state machine for a question-asking device which exemplifies this approach. The device comprises three turn state machines. There is an initial question—'Question1' (714), a repeat question—'Repeat' (715) and a follow-on question—'Question2' (716). Each of these turn state machines can comprise the state machine shown in FIG. 2 with two additional features. The first additional feature of the turn state machines is a Boolean parameter called 'BargeIn' which is associated with the state machine as a whole. This parameter modifies the behavior of the state machine as follows. Where this parameter is true, the turn state machine can yield the floor in the PreHold and PostHold zones as already described. Where this parameter is false then the turn state machine can hold the floor in all three zones (i.e. the HoldTimeout is set to infinity). Those skilled in the art will recognize that this is analogous to the current widely adopted practice where a boolean 'BargeIn' parameter controls whether a prompt is interruptible or not. Technically speaking the turn engine implements a 'Yield When Confident' when the HoldTimeouts are all set to infinity—the recognizer never stops listening and will cut the prompt if a confident result is received.

The question-answering device shown in FIG. 8 could be built using any prompt and recognition state machine that supports controllable BargeIn. Almost all current speech platforms fall into this category. The second additional feature of the turn state machine is an extra counter simply named 'RestartCount' which is used to keep a record of the number of times that the turn state machine is re-entered.

The question answering device shown in FIG. 8 starts by setting Question1.RestartCount to zero and setting Question1.BargeIn to true (701). The turn state machine Question1 (714) is then entered. This state machine executes its own internal states, playing the prompt e.g. 'What medical service do you want?' and performing recognition using a relevant grammar until it reaches the end state. On reaching the end state of FIG. 2 events are thrown depending on how the end state was reached—namely:

onConfidentReco—via transitions (112) (118)
onNoReco—via transitions (117) and (119)
onTurnComplete—via transition (104)

In the case of sustained background noise, the most likely completion event will be onNoReco via transition 119 with the state USER-GRABBING-FLOOR in the turn state machine state history list. The state machine of FIG. 8 catches these events and uses them to control the higher-level flow of the question device.

The onConfidentReco event is further qualified by an additional Boolean parameter 'Inter-word'. The onConfidentReco(NOT Inter-word) event (707) indicates that a confident speech recognition task has been completed and that a differentiated high-scoring recognition result has been returned by the speech recognizer. In this case the question answering device can complete throwing a onSuccess event status (717).

The onConfidentReco(Inter-word) event (706) also indicates that a confident speech recognition task has been completed, but there are a number of close-scoring items in the candidate list from the speech recognizer. In this case the device simply asks the caller to repeat the answer using another turn engine—Repeat (715) with the prompt 'Once again?'. Given that a successful recognition has occurred there is no reason to suppose that there is a particularly noisy environment so the Repeat.BargeIn is set to true (719). A confident result from this turn (708)—leads to successful completion of the question device (717). For simplicity of this description it is assumed that in the event of an Inter-word status from turn via (708) the result will be compared with the result from the first recognition and the best scoring candidate based on the two uncertain results is chosen. The precise nature of this comparison is not relevant to this invention and those skilled in the art will be aware of various methods to achieve this. An onNoReco status (710) can lead to failure of the question device as a whole (718).

Should the initial Question1 turn (714) return with an onNoReco event then one of two different state transitions may occur. A Boolean function NoisyInterruptionRestart( ) is used to determine which of these two transitions occurs. In the case where this function is true (704) the first question turn is started again. However prior to starting the turn again Question1.BargeIn is set to false and Question1.RestartCount is incremented (705). This transition is intended to trigger when it seems likely that the first attempt at asking Question 1 failed due to environmental noise—for example background chatter or other noises. In the simplest case the function NoisyInterruptionRestart( ) could assume that all failures of the turn were due to noise and simply use the count of the number of times the turn question has been asked.

A better alternative would be to assume that all turn failures which passed through the state USER-GRABBING-FLOOR when BargeIn was enabled were due to noise that caused a premature interruption of the prompt. The following reflects this.

```
boolean NoisyInterruptionRestart(Turn turn) {
    if (NOT turn.BargeIn) return false;
    if (turn.MatchHistory(USER-GRABBING-FLOOR) {
        if (turn.RestartCount==0) return true;
    }
    else return false;.
}
```

Those skilled in the art could conceive of other more complex definitions of this function which also take into account, for example, the prior history of dialog as a whole. Another alternative could take into account the turn confidence of previous turns to make its decision. More accurate determinations as to whether the recognition failure was due to noise or some other user behavior could be conceived. This invention will benefit from such improvements, but has utility in the simpler form described here.

Setting Question1.BargeIn to false in step (705) has the effect of preventing any environmental noise from accidentally causing the repeat of the prompt for Question1 from being accidentally interrupted. This also has the effect that any user speech which interrupts this prompt will also be apparently ignored by the state machine—although recall that the turn state machine can continue to listen and remember results when it is holding the floor. This floor holding may appear to be undesirable but recall that noise is likely to prevent the caller even hearing the whole turn before it is interrupted. Without floor holding the user may never even hear the question that they are expected to answer. It is thus much more preferable to the alternative of an unstable user interface in the presence of noise. Users who do speak over the prompt will find that the machine does not back-off—and as a result they will probably back-off instead (See FIG. 1D). As has already been stated—such circumstances are common in human-human conversation and the user will simply repeat the utterance at the end of the turn. The noisy environment will still affect the recognition accuracy of such an utterance, and may still result in an onNoReco event. The user has at least been guaranteed to have heard the whole turn and been given one attempt at answering the question.

In the case where this function is false (702) then the assumption is made that the first turn failed for reasons other than the first noisy interruption. The event onTurnComplete from Question1 is also simply treated as a failure—in this case the failure of the user to present any speech at all. This causes a follow-on turn—Question2 (716)—to be started. Before this, Question2.RestartCount is set to zero as per Question1, however Question2.BargeIn can be set to the same value as the most recent value of Question1.BargeIn (703). In this way the user interface continues to assume that there is a noisy environment and therefore holds the floor for the next question. The designer is free to choose the policy for promulgating this throughout the subsequent dialog.

In the case where Question2 completes confidently (709) the question device similarly completes throwing the onSuccess event (717). Similar comments to those above apply regarding the handling of an Inter-Word condition under these circumstances. Where it completes with onNoReco the same pattern of detecting noisy interruptions can be followed as per Question1 (712 and 713). This path cannot be followed in the case where Question2.BargeIn is set to true however thus avoiding successive question restarts. All other failures can result in the question device returning a failure condition (711).

It should be noted that these patterns can be applied to existing speech systems, although the feature of listening to speech during the prompt when the barge-in is false is rarely possible. This does not however stop the restart behaviour from being implemented.

Noise Stabilization Internal to the Turn Machine

Figure 9:
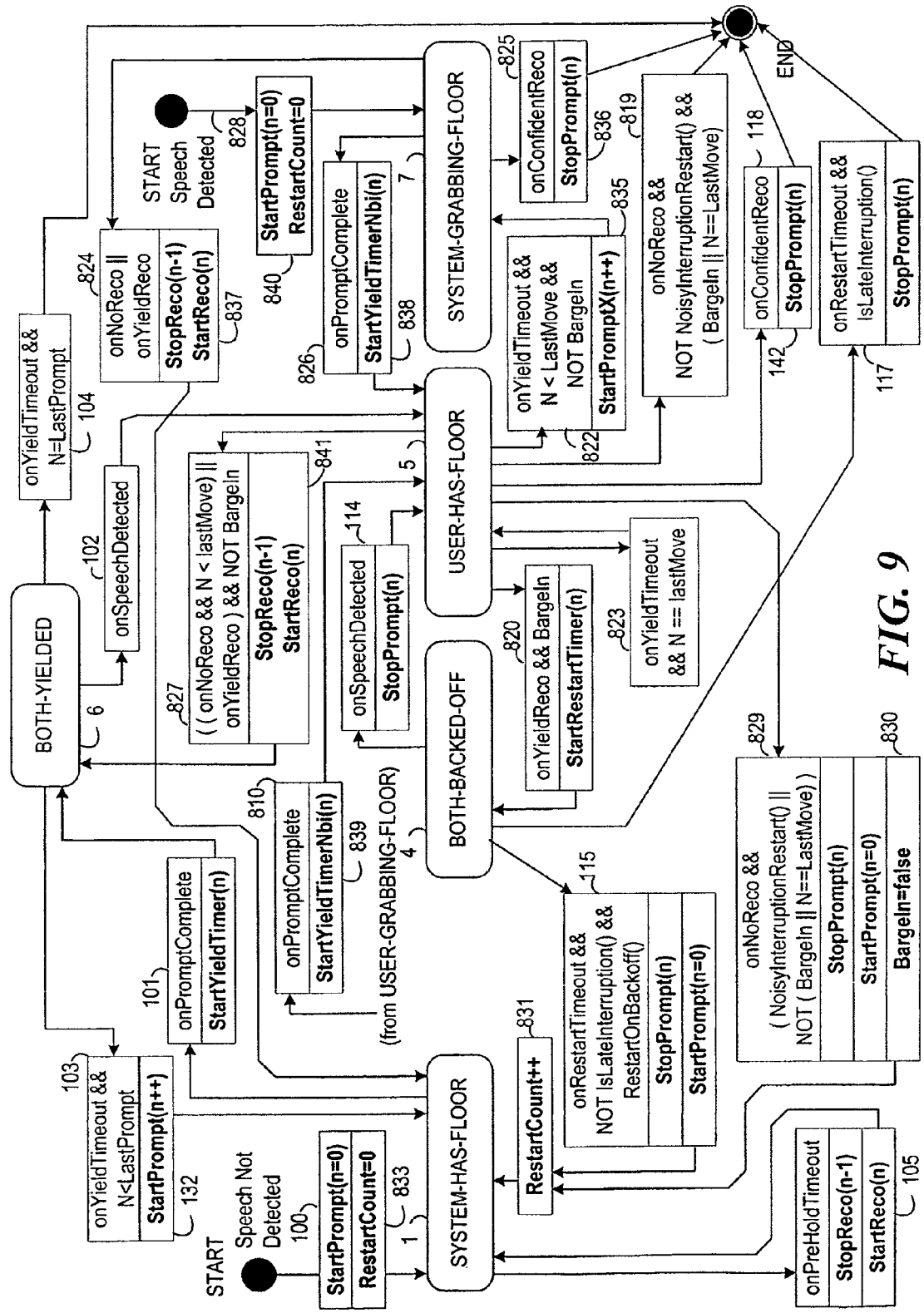
FIG. 9 illustrates a turn taking state machine which is extended to perform restarts in the presence of noise.

A further extension to the approach above would be to embed this noise stabilization approach into the turn machine itself. FIG. 9 shows how this is achieved. FIG. 9 is based upon the state machine of FIG. 2 or FIG. 7. For simplicity the states USER-GRABBING-FLOOR and SYSTEM-BACKED-OFF are omitted because they do not require any modification. Extending the state machine with the floor holding re-start pattern described above is straightforward. Firstly the newly added RestartCount can be set to zero on entry to the state machine (833). Secondly the transition from USER-HAS-FLOOR to the end state onNoReco (819) is modified to prevent the state machine completing unless NoisyInterruptionRestart( ) is false. Also the BargeIn flag must be true or the turn machine must be presenting the final move. For single-move turns this is always true and therefore not relevant. Multi move turns will be discussed later. An extra transition (829) from USER-HAS-FLOOR to SYSTEM-HAS-FLOOR then matches these excluded conditions. This new transition is the equivalent of moving the external restart transitions in FIG. 8 (i.e. 704 and 712) internal to the turn state machine. The BargeIn flag for the turn can be set to false (830) and the RestartCount can be incremented on this transition (831). This performs the same function of those operations seen in the transitions of FIG. 8 (705 and 713). The HoldTimeout(s) are also modified depending on the BargeIn flag as described above.

This change means that, subject to the definition of NoisyInterruptionRestart( ), all turns are now capable of the noisy restart behavior. It is sometimes desirable that this behavior can be suppressed on demand by the designer. The turn 'Repeat' in FIG. 8 (715) for example does not require the repeat behavior. An extra Boolean parameter 'AllowNoisyInterruptionRestarts' is added to the turn engine in order to achieve this. The definition of NoisyInterruptionRestart( ) thus becomes:

```
boolean NoisyInterruptionRestart(Turn turn) {
    if (NOT turn.AllowNoisyInterruptionRestarts) return false;
    if (NOT turn.BargeIn) return false;
    if (turn.MatchHistory(USER-GRABBING-FLOOR) {
    if (turn.RestartCount==0) return true;
    }
    else return false;.
    }
```

Figure 10:
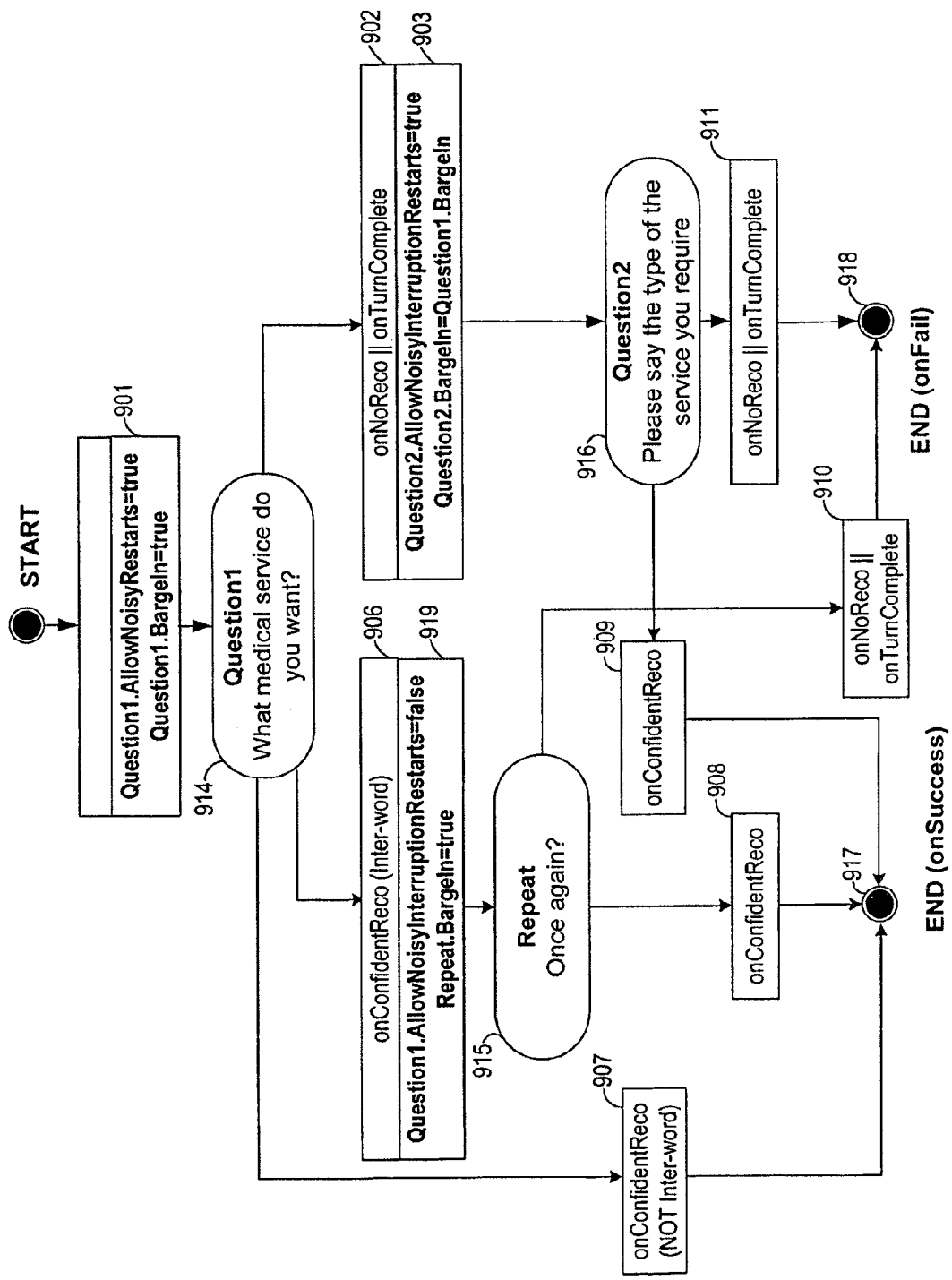
FIG. 10 illustrates an alternative embodiment of a question answering device which causes restarts in the presence of noise.

With just these modifications, the revised turn state machine of FIG. 9 can be used to deliver the same behavior as that shown in FIG. 8. FIG. 10 shows a new question asking device which uses the turn engine of FIG. 9 instead of that of FIG. 2 or 7. Note how the new question answering device has no need now to be aware of the restart behavior of the turns.

There are two benefits to internalizing this behavior. The first is that the turn engine of FIGS. 2 and 7 already had the ability to instigate their own internal re-starts. This happens on the transition from BOTH-BACKED-OFF to SYSTEM-HAS-FLOOR (115) which caters for the condition where both the machine and the user have backed-off and the machine decides to start the turn again. In the turn engine of FIG. 2 or 7 such restarts could potentially occur more than once if the function RestartOnBackoff( ) didn't keep count of the number of restarts attempted. This transition has not been altered in FIG. 9 but the newly added RestartCount parameter is now incremented when this transition happens (831). This counter can now be shared between RestartOnBackoff( ) and NoisyInterruptionRestart( )—ensuring for example that a turn restart only occurs once in the execution of the whole turn engine regardless of the cause of the turn restart.

The second benefit for internalizing the noisy restart behavior concerns multi-move turns. In the example of FIG. 8 all of the turns comprised a single move. If however, the turns were made up of multiple moves then there may have been a potential problem. Recall that the state machine is always listening. If speech onset is detected during prompt playback then the floor is given over to the speaker once the current move is completed even when the HoldTimeout(s) are infinite. Similarly speech onset during the pauses between moves causes the floor to be given over to the user. Thus without further modification to the turn engine, setting the BargeIn flag of the engine to false would still allow users to halt the progress of the turn at the first move boundary following speech onset. Recall that the pauses between moves are not generally points where the turn is completely relinquishing the floor (i.e. elective turn boundaries) but they are points where strong turn-taking cues are often present. Allowing onsets to lead to a turn-grab in such places is sensible behavior in a quiet environment, but if there is systematic environmental noise then it is very likely that the onSpeechDetected event may occur spuriously and cause the floor to be falsely yielded at such points.

For this reason the turn engine can be modified so that when the BargeIn flag is set to false it does not yield the floor at the move boundaries, in addition to floor-holding during prompt playback itself. The modification does not actually ignore onsets it merely stops onsets from preventing subsequent moves from starting. The recognizer is still active during this period. In order to achieve this, a new state has been added to the turn engine. This state, SYSTEM-GRABBING-FLOOR (7), represents the condition where the machine is grabbing the floor from the user. The operation of these modifications is described below by way of an example sequence of events in a three move turn.

Referring to FIG. 9, imagine that we are in the User-Has-Floor state and a transition has just been triggered by an OnNoReco from a noisy restart (829) at some point during the presentation of the first move of a three move turn. As described above, the RestartCount is incremented (831) and the BargeIn flag is set to false (830). As in the case of restarts caused by back-offs (115) the move counter n is then reset to zero, and the prompt associated with this move is started along with the PreHoldTimer. The turn starts executing from the beginning again—that is to say it restarts.

In order to explore the initial evolution of our example we need to return to FIG. 2 because for clarity the relevant states are omitted in FIG. 9. Let us now imagine that background noise immediately causes onSpeechDetected and a transition occurs (106) to the state USER-GRABBING-FLOOR. The BargeIn flag has set the HoldTimeout to infinity for all the move zones so transition 107 cannot cause the SYSTEM-BACKED-OFF state to be entered and the prompt will not be cut. Assume that the prompt for the first move completes throwing onPromptComplete. The recognizer is still listening to noise so the state machine moves to the state USER-HAS-FLOOR via transition 810. In the ordinary operation of FIG. 2 the subsequent moves would be suppressed at this point because the user has been given the floor. However, given the BargeIn flag is false we assume that the incoming 'speech' may actually be noise. For this reason the YieldTimer associated with the first move is started (839). Recall that this is the timeout between two moves and will thus be fairly short. Let us assume that this timeout completes whilst the recognizer is still listening to the noise when the onYieldTimeout event is triggered. The LastMove has not been reached and the BargeIn flag is false so a transition to SYSTEM-GRABBING-FLOOR occurs (822). This increments the move counter and starts the prompt for the next move (835) grabbing the floor back from the user—which in this case may be merely background noise. The turn engine has thus decided to start the next move in spite of the fact that the user may still be speaking.

Note that, unlike the case of the SYSTEM-HAS-FLOOR state, a PreHoldTimer is not started with the new move prompt. This is because in the SYSTEM-GRABBING-FLOOR state a recognition match is already known to be evolving. It would not be appropriate to kill it at the PreHold boundary and restart it—because confident recognition could be occurring. Instead, the recognizer can be stopped and restarted (837) on transition to the SYSTEM-HAS-FLOOR state in response to an onNoReco or onYieldReco event (824). That is to say the recognizer for the current move is started when the user appears to have backed-off or the noise has ceased.

As an aside, imagine the case where the user had in fact been uttering an in-vocabulary utterance and continued to speak in-spite of the machine grabbing the floor. Let us further assume that the recognizer returned a confident result (onConfidentReco) just after the system started to grab the floor back. In this case, the turn ends successfully (825) and the current prompt is stopped (836). Thus, in-spite of the BargeIn flag being set to false, the turn engine was still listening, and confident results do in fact force the turn to complete. This strategy is similar to the 'YieldWhenConfident' one discussed previously rather than the 'Always Hold'.

We return to the case where the system is grabbing the floor in the presence of noise. Let us further imagine the noise doesn't end and the prompt for the second move also completes. As before if the BargeIn flag is true (as it is likely to be given we are in SYSTEM-GRABBING-FLOOR state) then the yield timer for the next move is started (838) and the user has the floor again (826).

Now, the recognizer throws an onNoReco event during the pause between the second and third move prompts. The BargeIn flag is false and the last move has not started yet so the turn transitions into the BOTH-YIELDED state (827). This is another good point, if necessary, to stop the previous recognizer and ensure the recognizer matches the current move (841). In our example the visit is short lived however as continuing noise immediately triggers the onSpeechDetected event and the engine returns to the USER-HAS-FLOOR state (102).

As another aside it should be noted that with BargeIn set to false in the turn engine of FIG. 9, in the case of the onYieldReco event, the engine does not transition to the BOTH-BACKED-OFF state via transition (820); instead it can immediately transition to the BOTH-YIELDED state via transition (827). The transition into the BOTH-BACKED-OFF state (820) cannot occur. This avoids the need for the BOTH-BACKED-OFF state to deal with onYieldTimeout events. Thus users are not given the benefit of the RestartTimeout to restart their utterances. This is in line with the policy of floor holding when the BargeIn flag is false.

Returning to our example, the user (or noise) has the floor following the onSpeechDetected event. The YieldTimer for the second move then completes (822) and the prompt for the final move is started (835). Let us assume that this prompt completes before any recognition status is returned. In this case the USER-HAS-FLOOR state is reentered (826) and the final yield timeout starts (838). If this final yield timer completes, it is now ignored (823). This is because we have now completed the prompt for the final move and are at an elective turn boundary—i.e. the outcome of the next recognition event will determine the outcome of the whole turn. Confident recognition in this final phase will result in the turn engine completing. onNoReco will also cause the turn to complete assuming that the function NoisyInterruptionRestart( ) does not permit more than one restart in a turn. The RestartCount is now non-zero so the turn will not be restarted again via transition (829).

Subtle alterations to the emergent restart behavior can be envisaged by the redefinition of the functions NoisyInterruptionRestart( ), IsLateInterruption( ) and RestartOnBackoff( ). More than one restart could be permitted for example, or restarts in response to back-offs could be counted separately to those caused by apparent noise. The definition of IsLateInterruption( ) could be based on the location of speech onset during the turn rather than the moves. This may be more appropriate in turns which have a large number of short moves.

One additional feature of FIG. 9 is that there are now two START states depending on the state of the speech recognizer on entry into the state machine. Recall that the turn state machine is designed such that the exit state can be connected to the input state to achieve continuous recognition even across turn boundaries. By adding the SYSTEM-GRAB-BING-FLOOR move the turn machine can now be started correctly even under the condition that the recognizer has already detected user speech. Imagine the case where another state machine external to the turn machine has detected the condition that a user has begun to speak. Imagine further that this state machine decides that it wants to interrupt the user. This may be because the user has been speaking for too long, or the recognizer is listening to continuous noise. The external state machine can initiate the turn engine and enter it via the speech detected start state (828). The first move prompt can be started and the machine can enter the SYSTEM-GRABBING-FLOOR state and interrupt the user. The turn machine will then continue to run in just the same manner as if the turn machine itself had initiated the interruption.

In another subtly different embodiment, restarts which are caused by back-off (115) could also set the BargeIn flag to false. This may become necessary in environments with intermittent noise which may be mistaken for backed-off speech by the turn engine.

It is understood that multiple embodiments can take many forms and designs. Accordingly, several variations of the present design may be made without departing from the scope of this disclosure. The capabilities outlined herein allow for the possibility of a variety of networking models. This disclosure should not be read as preferring any particular networking model, but is instead directed to the underlying concepts on which these networking models can be built.

This disclosure comprises multiple embodiments. In a first embodiment, a method for managing interactive dialog between a machine and a user comprises: verbalizing at least one desired sequence of one or more spoken phrases; enabling a user to hear the at least one desired sequence of one or more spoken phrases; receiving audio input from the user or an environment of the user; determining a timing position of a possible speech onset from the audio input; and managing an interaction between the at least one desired sequence of spoken phrases and the audio input; in response to the timing position of the possible speech onset from the audio input. The first embodiment, further comprising managing the interaction in response to a timing position of a possible speech onset within a plurality of time zones, wherein the at least one desired sequence of one or more spoken phrases comprises the plurality of time zones. The first embodiment, wherein the plurality of time zones are dependent upon a continuous model of onset likelihood. The first embodiment, further comprising adjusting the at least one desired sequence of one or more spoken phrases in response to the timing position of the possible speech onset from the audio input.

The first embodiment, further comprising: stopping the at least one desired sequence of one or more spoken phrases; restarting the at least one desired sequence of one or more spoken phrases; or continuing the at least one desired sequence of one or more spoken phrases. The first embodiment, further comprising: adjusting the timing corresponding to stopping the at least one desired sequence of one or more spoken phrases; adjusting the timing corresponding to restarting the at least one desired sequence of one or more spoken phrases; or adjusting the timing corresponding to continuing the at least one desired sequence of one or more spoken phrases.

The first embodiment, further comprising: continuing the at least one desired sequence of one or more spoken phrases for a period of time in response to an interruption of the audio input; and receiving audio input during the period of time.

The first embodiment, wherein a configuration of a process to produce a recognition result from the audio input is dependent upon the timing position of the possible speech onset. The first embodiment, wherein a possible speech onset by the audio input during a beginning portion of one time zone is considered to be in response to a previous time zone. The first embodiment, wherein audio input further comprises user input that corresponds to dual tone multi frequency ("DTMF").

In a second embodiment, a method for interactive machine-to-person dialog comprising: verbalizing at least one desired sequence of one or more spoken phrases; enabling a user to hear the at least one desired sequence of one or more spoken phrases; receiving audio input from the user or an environment of the user; detecting a possible speech onset from the audio input; ceasing the at least one desired sequence of one or more spoken phrases in response to a detection of the possible speech onset; and managing an interaction between the at least one desired sequence of one or more spoken phrases and the audio input, wherein the interaction is dependent upon the timing of at least one recognition result relative to a cessation of the at least one desired sequence. The second embodiment, further comprising restarting or not restarting the at least one desired sequence of one or more spoken phrases in response to the timing position of receipt of the recognition result. The second embodiment, wherein restarting the at least one desired sequence of one or more spoken phrases further comprises altering the wording or intonation of the at least one desired sequence of one or more spoken phrases.

The second embodiment, wherein restarting the at least one desired sequence of spoken phrases further comprises restarting the at least one desired sequence of spoken phrases from a point that is not a beginning point of the at least one desired sequence of spoken phrases. The second embodiment, wherein restarting the at least one desired sequence of spoken phrases further comprises restarting the at least one desired sequence of spoken phrases from a point that is substantially near to where the desired sequence of one or more spoken phrases ceased. The second embodiment, further comprising adjusting an amplitude of the at least one desired sequence of one or more spoken phrases in response to a possible speech onset, wherein ceasing the at least one desired sequence of one or more phrases is achieved by a modulation of amplitude over time. (D3)

A third embodiment, a method for interactive machine-to-person dialog comprising: verbalizing at least one desired sequence of one or more spoken phrases; enabling a user to hear the at least one desired sequence of one or more spoken phrases; receiving audio input from the user or an environment of the user; detecting a possible speech onset from the audio input; ceasing the at least one desired sequence of one or more spoken phrases in response to a detection of possible speech onset at a point where onset occurred while the desired sequence was being verbalized; and managing a continuous interaction between the at least one desired sequence of one or more spoken phrases and the audio input, wherein the interaction is dependent upon at least one recognition result and whether the desired sequence of one or more spoken phrases was ceased or not ceased.

The third embodiment, wherein in response to a low confidence recognition result, a subsequent desired sequence of one or more spoken phrases does not cease after a detection of a subsequent possible speech onset. The third embodiment, wherein the subsequent desired sequence of one or more spoken phrases is substantially the same as the desired sequence of one or more spoken phrases. The third embodiment, further comprising, in response to a subsequent low confidence recognition result, receiving audio input while continuing to verbalize the at least one desired sequence of one or more spoken phrases, and in response to a subsequent high confidence recognition result, the subsequent desired sequence of one or more spoken phrases ceases after detection of possible speech onset.

Having thus described specific embodiments, it is noted that the embodiments disclosed are illustrative rather than limiting in nature and that a wide range of variations, modifications, changes, and substitutions are contemplated in the foregoing disclosure and, in some instances, some features may be employed without a corresponding use of the other features. Many such variations and modifications may be considered desirable by those skilled in the art based upon a review of the foregoing description of embodiments. Accordingly, it is appropriate that the appended claims be construed broadly and in a manner consistent with the scope of these embodiments.

The invention claimed is:

1. A method for managing a dialog between an interactive system configured to provide a prompt comprising one or more phrases and a user comprising the steps:
audibly providing to the user a first portion of said prompt by said interactive system wherein said prompt comprises one or more phrases;
detecting an audible input at the interactive system wherein said audible input potentially is speech response from the user, said audible input detected during the provision of a particular phrase of said one or more phrases, wherein said particular phrase comprises a prehold portion and a hold portion wherein said prehold portion occurs before said hold portion;
determining an audible input onset time during the particular phrase when onset of said audible input is detected by said interactive system;
terminating audibly providing to the user by said interactive system a remaining portion of the particular phrase when said audible input onset time occurs during said prehold portion of said particular phrase; and
continuing to audibly provide said remaining portion of said particular phrase to said user when said audible input onset time occurs during said hold portion of said particular phrase.

2. The method of claim 1 further comprising the step of:
running a prehold timer wherein said prehold timer is started in said interactive system when said particular phrase is audibly provided to the user and said prehold timer is stopped after a certain duration, wherein if said audible onset input is detected during said prehold timer, said interactive system terminates providing to said user said remaining portion of the particular phrase.

3. The method of claim 1 wherein said particular phrase further comprises a posthold portion, and wherein said interactive system continues to provide said prompt to said user when said audible input onset time occurs during said posthold portion of said particular phrase.

4. The method of claim 1 wherein a HoldTimeOut timer at the interactive system is started upon detecting onset of said audible input and has an expiration time; and
said interactive system continues to audibly provide to the user said remaining portion of the particular phrase until said expiration time is reached.

5. The method of claim 4 wherein the expiration of HoldTimeOut timer varies based on when said onset of said audible input is detected by said interactive system.

6. A method for managing a dialog between an interactive system configured to provide a prompt comprising one or more phrases and a user comprising the steps:
audibly providing to the user a first portion of said prompt by said interactive system wherein said prompt comprises one or more phrases;
detecting an audible input at the interactive system wherein said audible input potentially is speech response from the user, said audible input detected during the provision of a particular phrase of said one or more phrases, wherein said particular phrase comprises a hold portion and a posthold portion, wherein said posthold portion occurs after said hold portion;
determining an audible input onset time during the particular phase when onset of said audible input is detected by said interactive system;
continuing to audibly provide a remaining portion of said particular phrase to said user when said audible input onset time occurs during said hold portion of said particular phrase; and
terminating audibly providing to the user by said interactive system the remaining portion of the particular phrase when said audible input onset time occurs during said posthold portion of said particular phrase.

7. The method of claim 6 further comprising the step of:
starting a HoldTimeOut timer at the interactive system upon detecting said audible input, wherein terminating audibly providing the remaining portion of the particular phrase occurs when said HoldTimeOut timer expires.

* * * * *